US012530822B2

United States Patent
Ravi et al.

(10) Patent No.: US 12,530,822 B2
(45) Date of Patent: Jan. 20, 2026

(54) UTILIZING A DIFFUSION PRIOR NEURAL NETWORK FOR TEXT GUIDED DIGITAL IMAGE EDITING

(71) Applicant: Adobe Inc., San Jose, CA (US)

(72) Inventors: Hareesh Ravi, San Jose, CA (US); Sachin Kelkar, Santa Clara, CA (US); Midhun Harikumar, Santa Clara, CA (US); Ajinkya Gorakhnath Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 410 days.

(21) Appl. No.: 18/308,017

(22) Filed: Apr. 27, 2023

(65) Prior Publication Data

US 2024/0362842 A1    Oct. 31, 2024

(51) Int. Cl.
*G06T 11/60* (2006.01)
*G06T 5/00* (2024.01)
*G06T 5/70* (2024.01)

(52) U.S. Cl.
CPC ............. *G06T 11/60* (2013.01); *G06T 5/70* (2024.01); *G06T 2200/24* (2013.01); *G06T 2207/20084* (2013.01)

(58) Field of Classification Search
CPC ....... G06T 11/60; G06T 5/70; G06T 2200/24; G06T 2207/20084
See application file for complete search history.

(56) References Cited

U.S. PATENT DOCUMENTS

2023/0042221 A1* 2/2023 Xu ................. G06N 3/0475
2024/0331235 A1* 10/2024 Smock ............... G16C 20/70

OTHER PUBLICATIONS

NPL: Results Publication Date Range: Mar. 8, 2007 to Jul. 22, 2025.*
NPL: Results Publication Date Range: Nov. 23, 2023 to Oct. 2, 2025.*
Omri Avrahami, Dani Lischinski, and Ohad Fried. Blended diffusion for text-driven editing of natural images. In Proceedings of the IEEE/CVF Conference on Computer Vision and Pattern Recognition, pp. 18208-18218, 2022.

(Continued)

*Primary Examiner* — Quang N Vo
(74) *Attorney, Agent, or Firm* — Keller Preece PLLC

(57) ABSTRACT

The present disclosure relates to systems, methods, and non-transitory computer readable media for utilizing a diffusion prior neural network for text guided digital image editing. For example, in one or more embodiments the disclosed systems utilize a text-image encoder to generate a base image embedding from the base digital image and an edit text embedding from edit text. Moreover, the disclosed systems utilize a diffusion prior neural network to generate a text-image embedding. In particular, the disclosed systems inject the base image embedding at a conceptual editing step of the diffusion prior neural network and condition a set of steps of the diffusion prior neural network after the conceptual editing step utilizing the edit text embedding. Furthermore, the disclosed systems utilize a diffusion neural network to create a modified digital image from the text-edited image embedding and the base image embedding.

20 Claims, 14 Drawing Sheets

(56) References Cited

OTHER PUBLICATIONS

Yogesh Balaji, Seungjun Nah, Xun Huang, Arash Vahdat, Jiaming Song, Karsten Kreis, Miika Aittala, Timo Aila, Samuli Laine, Bryan Catanzaro, Tero Karras, and Ming-Yu Liu. ediff-i: Text-to-image diffusion models with an ensem-ble of expert denoisers. arXiv:2211.01324, 2022.

Tim Brooks, Aleksander Holynski, and Alexei A. Efros. In—structpix2pix: Learning to follow image editing instructions, 2022.

Yu Cheng, Zhe Gan, Yitong Li, Jingjing Liu, and Jianfeng Gao. Sequential attention gan for interactive image editing. In Proceedings of the 28th ACM international conference on multimedia, pp. 4383-4391, 2020.

Huiwen Chang, Han Zhang, Jarred Barber, AJ Maschinot, Jose Lezama, Lu Jiang, Ming-Hsuan Yang, Kevin Murphy, William T. Freeman, Michael Rubinstein, Yuanzhen Li, and Dilip Krishnan. Muse: Text-to-image generation via masked generative transformers. 2023.

Yunjey Choi, Minje Choi, Munyoung Kim, Jung-Woo Ha, Sunghun Kim, and Jaegul Choo. Stargan: Unified genera-tive adversarial networks for multi-domain image-to-image translation. In Proceedings of the IEEE conference on computer vision and pattern recognition, pp. 8789-8797, 2018.

Guillaume Couairon, Jakob Verbeek, Holger Schwenk, and Matthieu Cord. Diffedit: Diffusion-based semantic image editing with mask guidance. In International Conference on Learning Representations, 2023.

Katherine Crowson, Stella Biderman, Daniel Kornis, Dashiell Stander, Eric Hallahan, Louis Castricato, and Ed-ward Raff. Vqgan-clip: Open domain image generation and editing with natural language guidance. In Computer Vision—ECCV 2022: 17th European Conference, Tel Aviv, Israel, Oct. 23-27, 2022, Proceedings, Part XXXVII, pp. 88-105. Springer, 2022.

Prafulla Dhariwal and Alex Nichol. Diffusion models beat gans on image synthesis. arXiv:2105.05233, 2021.

Patrick Esser, Johnathan Chiu, Parmida Atighehchian, Jonathan Granskog, and Anastasis Germanidis. Structure and content-guided video synthesis with diffusion models, 2023.

Patrick Esser, Robin Rombach, and Bjo"rn Ommer. Tam-ing transformers for high-resolution image synthesis. arXiv:2012.09841, 2020.

Rinon Gal, Or Patashnik, Haggai Maron, Amit H Bermano, Gal Chechik, and Daniel Cohen-Or. Stylegan-nada: Clip-guided domain adaptation of image generators. ACM Trans-actions on Graphics (TOG), 41(4):1-13, 2022.

Ian J. Goodfellow, Jean Pouget-Abadie, Mehdi Mirza, Bing Xu, David Warde-Farley, Sherjil Ozair, Aaron Courville, and Yoshua Bengio. Generative adversarial networks. arXiv:1406.2661, 2014.

Amir Hertz, Ron Mokady, Jay Tenenbaum, Kfir Aberman, Yael Pritch, and Daniel Cohen-Or. Prompt-to-prompt im-age editing with cross attention control. arXiv preprint arXiv:2208.01626, 2022.

Jonathan Ho, William Chan, Chitwan Saharia, Jay Whang, Ruiqi Gao, Alexey Gritsenko, Diederik P. Kingma, Ben Poole, Mohammad Norouzi, David J. Fleet, and Tim Sali-mans. Imagen video: High definition video generation with diffusion models, 2022.

Jonathan Ho, Ajay Jain, and Pieter Abbeel. Denoising dif-fusion probabilistic models. arXiv:2006.11239, 2020.

Jonathan Ho and Tim Salimans. Classifier-free diffusion guidance. arXiv:2207.12598, 2022.

Xun Huang, Ming-Yu Liu, Serge Belongie, and Jan Kautz. Multimodal unsupervised image-to-image translation. In Proceedings of the European conference on computer vision (ECCV), pp. 172-189, 2018.

Tero Karras, Miika Aittala, Timo Aila, and Samuli Laine. Elucidating the design space of diffusion-based generative models, 2022.

Tero Karras, Samuli Laine, Miika Aittala, Janne Hellsten, Jaakko Lehtinen, and Timo Aila. Analyzing and improv-ing the image quality of stylegan. In Proceedings of the IEEE/CVF conference on computer vision and pattern recognition, pp. 8110-8119, 2020.

Bahjat Kawar, Shiran Zada, Oran Lang, Omer Tov, Huiwen Chang, Tali Dekel, Inbar Mosseri, and Michal Irani. Imagic: Text-based real image editing with diffusion models, 2022.

Cheng Lu, Yuhao Zhou, Fan Bao, Jianfei Chen, Chongxuan Li, and Jun Zhu. Dpm-solver++: Fast solver for guided sampling of diffusion probabilistic models. arXiv:2211.01095, 2022.

Gwanghyun Kim, Taesung Kwon, and Jong Chul Ye. Diffusionclip: Text-guided diffusion models for robust image manipulation. In Proceedings of the IEEE/CVF Conference on Computer Vision and Pattern Recognition (CVPR), pp. 2426-2435, Jun. 2022.

Luping Liu, Yi Ren, Zhijie Lin, and Zhou Zhao. Pseudo numerical methods for diffusion models on manifolds. arXiv:2202.09778, 2022.

Andreas Lugmayr, Martin Danelljan, Andres Romero, Fisher Yu, Radu Timofte, and Luc Van Gool. Repaint: Inpainting using denoising diffusion probabilistic models. 2022.

Chenlin Meng, Yutong He, Yang Song, Jiaming Song, Jia-jun Wu, Jun-Yan Zhu, and Stefano Ermon. Sdedit: Guided image synthesis and editing with stochastic differential equa-tions. 2021.

Chenlin Meng, Robin Rombach, Ruiqi Gao, Diederik P. Kingma, Stefano Ermon, Jonathan Ho, and Tim Salimans. On distillation of guided diffusion models. arXiv:2210.03142, 2022.

Ron Mokady, Amir Hertz, Kfir Aberman, Yael Pritch, and Daniel Cohen-Or. Null-text inversion for editing real images using guided diffusion models, 2022.

Alex Nichol and Prafulla Dhariwal. Improved denoising diffusion probabilistic models. arXiv:2102.09672, 2021.

Alex Nichol, Prafulla Dhariwal, Aditya Ramesh, Pranav Shyam, Pamela Mishkin, Bob McGrew, Ilya Sutskever, and Mark Chen. Glide: Towards photorealistic image generation and editing with text-guided diffusion models. arXiv:2112.10741, 2021.

Dong Huk Park, Grace Luo, Clayton Toste, Samaneh Azadi, Xihui Liu, Maka Karalashvili, Anna Rohrbach, and Trevor Darrell. Shape-guided diffusion with inside-outside atten-tion, 2022.

Taesung Park, Jun-Yan Zhu, Oliver Wang, Jingwan Lu, Eli Shechtman, Alexei Efros, and Richard Zhang. Swapping au-toencoder for deep image manipulation. Advances in Neural Information Processing Systems, 33:7198-7211, 2020.

Or Patashnik, Zongze Wu, Eli Shechtman, Daniel Cohen-Or, and Dani Lischinski. Styleclip: Text-driven manipulation of stylegan imagery. In Proceedings of the IEEE/CVF In-ternational Conference on Computer Vision (ICCV), pp. 2085-2094, Oct. 2021.

Konpat Preechakul, Nattanat Chatthee, Suttisak Wizad-wongsa, and Supasorn Suwajanakorn. Diffusion autoen-coders: Toward a meaningful and decodable representation. In IEEE Conference on Computer Vision and Pattern Recog-nition (CVPR), 2022.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, Gretchen Krueger, and Ilya Sutskever. Learning transferable visual models from natural language supervision. 2021.

Aditya Ramesh, Prafulla Dhariwal, Alex Nichol, Casey Chu, and Mark Chen. Hierarchical text-conditional image gener-ation with clip latents. arXiv:2204.06125, 2022.

Robin Rombach, Andreas Blattmann, Dominik Lorenz, PatrickEsser,andBjo"rnOmmer.High-resolutionimagesyn-thesis with latent diffusion models. arXiv:2112.10752, 2021.

Olaf Ronneberger, Philipp Fischer, and Thomas Brox. U-net: Convolutional networks for biomedical image segmentation, 2015.

Chitwan Saharia, William Chan, Huiwen Chang, Chris A. Lee, Jonathan Ho, Tim Salimans, David J. Fleet, and Mo-hammad Norouzi. Palette: Image-to-image diffusion mod-els. 2021.

Chitwan Saharia, William Chan, Saurabh Saxena, Lala Li, Jay Whang, Emily Denton, Seyed Kamyar Seyed Ghasemipour, Burcu Karagol Ayan, S. Sara Mahdavi, Rapha Gontijo Lopes, Tim Salimans, Jonathan Ho, David J Fleet, and Mohammad Norouzi. Photorealistic text-to-image diffusion models with deep language understanding. 2022.

Tim Salimans and Jonathan Ho. Progressive distillation for fast sampling of diffusion models. arXiv:2202.00512, 2022.

(56) References Cited

OTHER PUBLICATIONS

Uriel Singer, Adam Polyak, Thomas Hayes, Xi Yin, Jie An, Songyang Zhang, Qiyuan Hu, Harry Yang, Oron Ashual, Oran Gafni, Devi Parikh, Sonal Gupta, and Yaniv Taigman. Make-a-video: Text-to-video generation without text-video data. 2022.

Jascha Sohl-Dickstein, Eric A. Weiss, Niru Mah-eswaranathan, and Surya Ganguli. Deep unsupervised learning using nonequilibrium thermodynamics, 2015.

Jiaming Song, Chenlin Meng, and Stefano Ermon. Denois-ing diffusion implicit models. arXiv:2010.02502, 2020.

Narek Tumanyan, Michal Geyer, Shai Bagon, and Tali Dekel. Plug-and-play diffusion features for text-driven image-to-image translation, 2022.

Dani Valevski, Matan Kalman, Yossi Matias, and Yaniv Leviathan. Unitune: Text-driven image editing by fine tun-ing an image generation model on a single image, 2022.

Bram Wallace, Akash Gokul, and Nikhil Naik. Edict: Exact diffusion inversion via coupled transformations, 2022.

Ting-Chun Wang, Ming-Yu Liu, Jun-Yan Zhu, Andrew Tao, Jan Kautz, and Bryan Catanzaro. High-resolution image syn-thesis and semantic manipulation with conditional gans. In Proceedings of the IEEE conference on computer vision and pattern recognition, pp. 8798-8807, 2018.

Zongze Wu, Dani Lischinski, and Eli Shechtman. Stylespace analysis: Disentangled controls for stylegan image generation. In Proceedings of the IEEE/CVF Conference on Com-puter Vision and Pattern Recognition, pp. 12863-12872, 2021.

Jiahui Yu, Yuanzhong Xu ,Jing Yu Koh,Thang Luong,Gun-jan Baid, Zirui Wang, Vijay Vasudevan, Alexander Ku, Yin-fei Yang, Burcu Karagol Ayan, Ben Hutchinson, Wei Han, Zarana Parekh, Xin Li, Han Zhang, Jason Baldridge, and Yonghui Wu. Scaling autoregres-sive models for content-rich text-to-image generation. 2022.

Qinsheng Zhang and Yongxin Chen. Fast sampling of diffu-sion models with exponential integrator. arXiv:2204.13902, 2022.

Richard Zhang, Phillip Isola, Alexei A. Efros, Eli Shechtman, and Oliver Wang. The unreasonable effectiveness of deep features as a perceptual metric. CoRR, abs/1801.03924, 2018.

Wanfeng Zheng, Qiang Li, Xiaoyan Guo, Pengfei Wan, and Zhongyuan Wang. Bridging clip and stylegan through latent alignment for image editing. arXiv preprint arXiv:2210.04506, 2022.

Yufan Zhou, Bingchen Liu, Yizhe Zhu, Xiao Yang, Changyou Chen, and Jinhui Xu. Shifted diffusion for text-to-image generation. 2022.

Jiapeng Zhu, Yujun Shen, Deli Zhao, and Bolei Zhou. In-domain gan inversion for real image editing. In Computer Vision—ECCV 2020: 16th European Conference, Glasgow, UK, Aug. 23-28, 2020, Proceedings, Part XVII 16, pp. 592-608. Springer, 2020.

Jun-Yan Zhu, Taesung Park, Phillip Isola, and Alexei A Efros. Unpaired image-to-image translation using cycle-consistent adversarial networks. In Proceedings of the IEEE international conference on computer vision, pp. 2223-2232, 2017.

\* cited by examiner

UTILIZING A DIFFUSION PRIOR NEURAL NETWORK FOR TEXT GUIDED DIGITAL IMAGE EDITING

BACKGROUND

Recent developments in hardware and software platforms have led to innovations in systems and methods for digital image editing and generation. For example, conventional systems can utilize various generative machine learning models to create or edit digital images according to different prompts or inputs. Thus, for example, some conventional systems can utilize diffusion neural networks to generate a digital image from a text input. Despite these advances, however, many conventional systems continue to demonstrate a number of deficiencies or drawbacks, particularly in flexibility, accuracy, and efficiency of implementing computing devices.

SUMMARY

This disclosure describes one or more embodiments of systems, methods, and non-transitory computer readable media that solve one or more of the foregoing or other problems in the art with systems and methods for utilizing a diffusion prior neural network for text guided digital image editing. For example, the disclosed systems utilize a trained text-image encoder (e.g., a CLIP model) to generate base image embeddings (from a base digital image) and edit text embeddings (from a text prompt). Moreover, in one or more implementations, the disclosed systems utilize a diffusion prior model that generates text-edited image embeddings from the base image embeddings conditioned on the edit text embeddings. The disclosed systems utilize the diffusion prior model to perform text guided conceptual edits on the base image embeddings (e.g., within the image embedding space) without finetuning or optimization. The disclosed systems can utilize this approach together with structure preserving edits within a diffusion decoder (e.g., a latent diffusion model). For example, in one or more embodiments, the disclosed systems use a reverse diffusion model (e.g., reverse DDIM) to perform structure preserving edits as part of the text guided image editing process. The disclosed system does not require additional inputs, finetuning, optimization or objects while generating quantitatively and qualitatively improved results.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
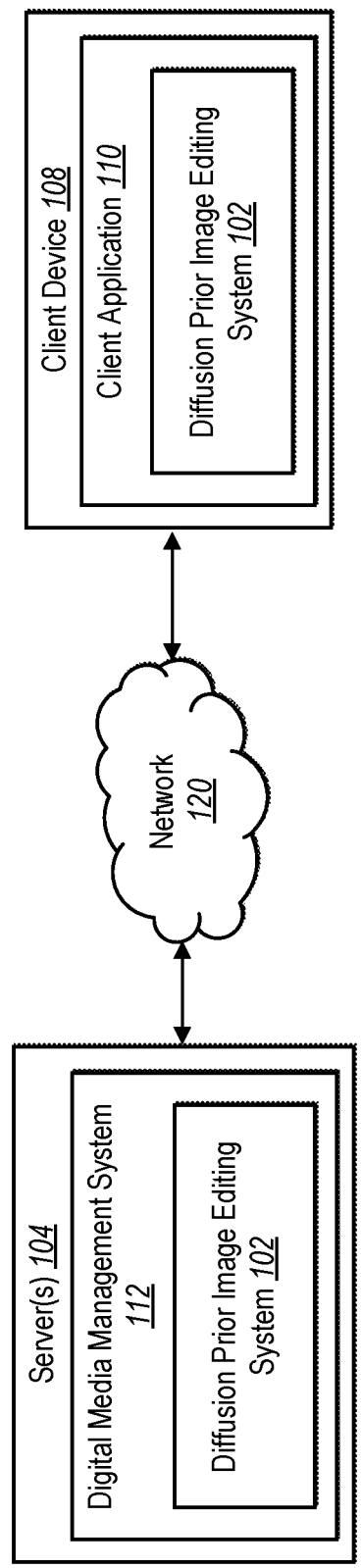
FIG. 1 illustrates an example system environment in which a diffusion prior image editing system operates in accordance with one or more embodiments.

This disclosure describes one or more embodiments of a diffusion prior image editing system that efficiently, flexibly, and accurately utilizes a diffusion prior neural network for text guided digital image editing. In particular, the diffusion prior image editing system utilizes a diffusion prior model to perform a text guided conceptual edit of a base image embedding. The diffusion prior image editing system can thus perform a latent walk in the image embedding space by moving an embedding along a specific direction. However, instead of manually discovering directions, the diffusion prior image editing system moves a base image embedding along a suitable direction determined by the text conditioning to generate a text-edited image embedding (i.e., an embedding that has context from both edit text and a base image). In one or more embodiments, the diffusion prior image editing system utilizes a conceptual edit controller to specify trade-offs between the edit text and the base image. In one or more implementations, the diffusion prior image editing system also utilizes the text-edited image embedding and the base image embedding with a diffusion noising model (e.g., SDEdit or Reverse DDIM) to perform a structural edit with a diffusion decoder. Utilizing this approach, the disclosed systems can generate realistic digital images, flexibly adapted by different controllers, and without requiring inefficiencies of conventional systems such as a base prompt, optimizations of embeddings, fine-tuning model weights, additional guidance, training new models, or additional objectives.

As discussed above, conventional systems have a variety of technical deficiencies with regard to generating digital images. For example, many conventional systems require a variety of inefficient processes during implementation to generate modified digital images from a text prompt. To illustrate, some systems require application of various loss functions during implementation to generate a digital image. Accordingly, conventional systems often include embedding optimizations or processes for fine-tuning model weights in generating digital images. Conventional systems also often require additional guidance, objectives, or training during model implementation. Some systems also require a base text prompt that describes the contents of an input digital image. This requirement is significant because most digital images do not have a companion base text description. Accordingly, these conventional systems often necessitate either a client device to provide a base text prompt and/or a separate machine learning model to generate a text prompt from a digital image. This approach thus increases the time, processing power, and computer resources needed to generate a digital image. In sum, existing approaches rely on text conditioned diffusion models and require compute intensive optimization of text embeddings or fine-tuning the model weights for text guided image editing.

Furthermore, conventional systems are also inflexible. For example, some conventional systems utilize a hybrid diffusion model approach in generating digital images but generate digital images according to rigid parameters. For example, conventional systems analyze a digital image and text in a rigid black box approach to generate an output image without flexible options for modification of the output image (other than modifying the input image and/or text prompt).

Moreover, conventional systems are often inaccurate or unrealistic. To illustrate, some conventional systems generate digital images with artifacts or properties that fail to reflect the input digital image and/or the edit text describing the preferred modification to the digital image. Furthermore, the inefficiencies and inflexibilities described above further undermine the ability of conventional systems to generate digital images that accurately reflect the desired properties of modified digital images.

As suggested above, embodiments of the diffusion prior image editing system provide certain improvements or advantages over conventional systems. Indeed, by utilizing a conceptual editing process within a diffusion prior neural network (and a structural editing process within a diffusion neural network), the diffusion prior image editing system can generate digital images without many of the inefficiencies that plague conventional systems. Indeed, the disclosed systems can utilize a diffusion prior neural network to convert a base image embedding to a text-edited image embedding within the diffusion prior model. In this manner, the disclosed system avoids the need to identify or generate a base text prompt.

Furthermore, in one or more embodiments, the diffusion prior image editing system utilizes the base image embedding with a diffusion noising model to generate a base image noise map that forms the foundation for a diffusion decoder. By utilizing the base image noise map and conditioning denoising steps of the diffusion decoder on the text-edited image embedding, the diffusion prior image editing system can generate digital images without requiring embedding optimizations or processes for fine-tuning model weights. Similarly, the diffusion prior image editing system does not require additional guidance, objectives, or training during model implementation. Thus, the disclosed systems improve computer efficiency and reduce processing requirements commonly associated with generating or identifying base text prompts or performing these additional processes.

The diffusion prior image editing system also improves flexibility. Indeed, the diffusion prior image editing system can provide conceptual edit controllers and/or structural edit controllers that allow for flexible manipulation of internal diffusion processes for generating modified digital images. Indeed, the diffusion prior image editing system can flexibly select a conceptual editing denoising step within the diffusion prior neural network based on interaction with the conceptual edit controller. By varying the conceptual editing denoising step within the diffusion prior neural network, the diffusion prior image editing system can flexibly vary the impact of the base digital image relative to the edit text in the modified digital image.

Similarly, the diffusion prior image editing system can provide a similar control with regard to structural edits within a diffusion noising model and/or diffusion neural network. Based on user interaction with a structural edit controller, the diffusion prior image editing system can select a structural number of steps (i.e., a number of structural noising steps and/or a number of structural denoising steps) corresponding the diffusion noising model and the diffusion neural network. By varying the structural number of steps, the diffusion prior image editing system can vary the amount of fidelity to the structure of the base digital image (or vary the freedom with which the model can generate content independent of the base digital image).

The diffusion prior image editing system can also improve accuracy. Indeed, as demonstrated in greater detail below, the diffusion prior image editing system can generate modified digital images that realistically and/or accurately align to an input digital image and corresponding edit text. Furthermore, due to the flexibility and efficiency improvements discussed above, the diffusion prior image editing system can more accurately align a modified digital image to the desired balance between edit text and base image characteristics.

Additional detail regarding the diffusion prior image editing system will now be provided with reference to the figures. For example, FIG. 1 illustrates a schematic diagram of an example system environment for implementing a diffusion prior image editing system 102 in accordance with one or more embodiments. An overview of the diffusion prior image editing system 102 is described in relation to FIG. 1. Thereafter, a more detailed description of the components and processes of the diffusion prior image editing system 102 is provided in relation to the subsequent figures.

As shown, the environment includes server(s) 104, client device 108, a digital media management system 112, and a network 120. Each of the components of the environment communicate via the network 120, and the network 120 is any suitable network over which computing devices communicate. Example networks are discussed in more detail below in relation to FIG. 13.

As mentioned, the environment includes the client device 108. The client device 108 is one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single instance of the client device 108, in some embodiments, the environment includes multiple different client devices, each associated with a different user. The client device 108 communicates with the server(s) 104 and/or the digital media management system 112 via the network 120. For example, the client device 108 transmits one or more digital images to the digital media management system 112 and provides information to server(s) 104 indicating client device interactions (e.g., edit text or interactions with controllers).

As shown in FIG. 1, the client device 108 includes a client application 110. In particular, the client application 110 is a web application, a native application installed on the client device 108 (e.g., a mobile application or a desktop application), or a cloud-based application where all or part of the functionality is performed by the server(s) 104. The client application 110 presents or displays information to a user, including digital images and/or modified digital images generated utilizing the diffusion prior image editing system 102.

As further illustrated in FIG. 1, the environment includes a digital media management system 112. In particular, the digital media management system 112 receives, generates, modifies, provides, stores, manages, and/or distributes digital media. For example, the digital media management system 112 stores digital media such as digital images or digital videos, provides the digital media for display, edits the digital media, and manages access to the digital media to authorized devices. In some cases, the digital media management system 112 utilizes a database to store or maintain digital media.

As illustrated in FIG. 1, the environment includes the server(s) 104. In some embodiments, the server(s) 104 communicates with the client device 108 to transmit and/or receive data via the network 120. In some embodiments, the server(s) 104 comprises a distributed server where the server(s) 104 includes a number of server devices distributed across the network 120 and located in different physical locations. The server(s) 104 comprise a content server, an application server, a communication server, a web-hosting server, a multidimensional server, or a machine learning server.

As further shown in FIG. 1, the server(s) 104 also includes the diffusion prior image editing system 102 as part of the digital media management system 112. For example, as discussed in greater detail below, the diffusion prior image editing system 102 analyzes base digital images and/or edit text to generate modified digital images. Moreover, the diffusion prior image editing system can utilize a text-image encoder, a diffusion prior neural network, a diffusion noising network, and/or a diffusion neural network to flexibly generate modified digital images that reflect both a base digital image and edit text.

In one or more embodiments, the server(s) 104 includes all, or a portion of, the diffusion prior image editing system 102. For example, the diffusion prior image editing system 102 operates on the server(s) 104 to generate modified digital images. In certain cases, the client device 108 includes all or part of the diffusion prior image editing system 102. For example, the client device 108 generates, obtains (e.g., download), or utilizes one or more aspects of the diffusion prior image editing system 102, such as the text-image encoder, the diffusion prior neural network, the diffusion noising network, and/or the diffusion neural network from the server(s) 104. Indeed, in some implementations, as illustrated in FIG. 1, the diffusion prior image editing system 102 is located in whole or in part of the client device 108. For example, the diffusion prior image editing system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the diffusion prior image editing system 102. For example, in some embodiments, the server(s) 104 train one or more machine learning models/neural networks discussed herein and provide the one or more machine learning models/neural networks to the client device 108 for implementation. In some embodiments, the server(s) 104 trains one or more machine learning models/neural networks together with the client device 108.

Although FIG. 1 illustrates a particular arrangement of the environment, in some embodiments, the environment has a different arrangement of components and/or may have a different number or set of components altogether. For instance, as mentioned, the diffusion prior image editing system 102 is implemented by (e.g., located entirely or in part on) the client device 108. In addition, in one or more embodiments, the client device 108 communicates directly with the diffusion prior image editing system 102 at the server(s) 104, bypassing the network 120.

As mentioned, in one or more embodiments, the diffusion prior image editing system 102 generates a modified digital image from a digital image and edit text utilizing a diffusion prior neural network. In particular, FIG. 2 illustrates the diffusion prior image editing system 102 generating a modified digital image 212 from a base digital image 202 and edit text 204 utilizing a diffusion prior neural network 206 and a diffusion neural network 210 in accordance with one or more embodiments.

Figure 2:
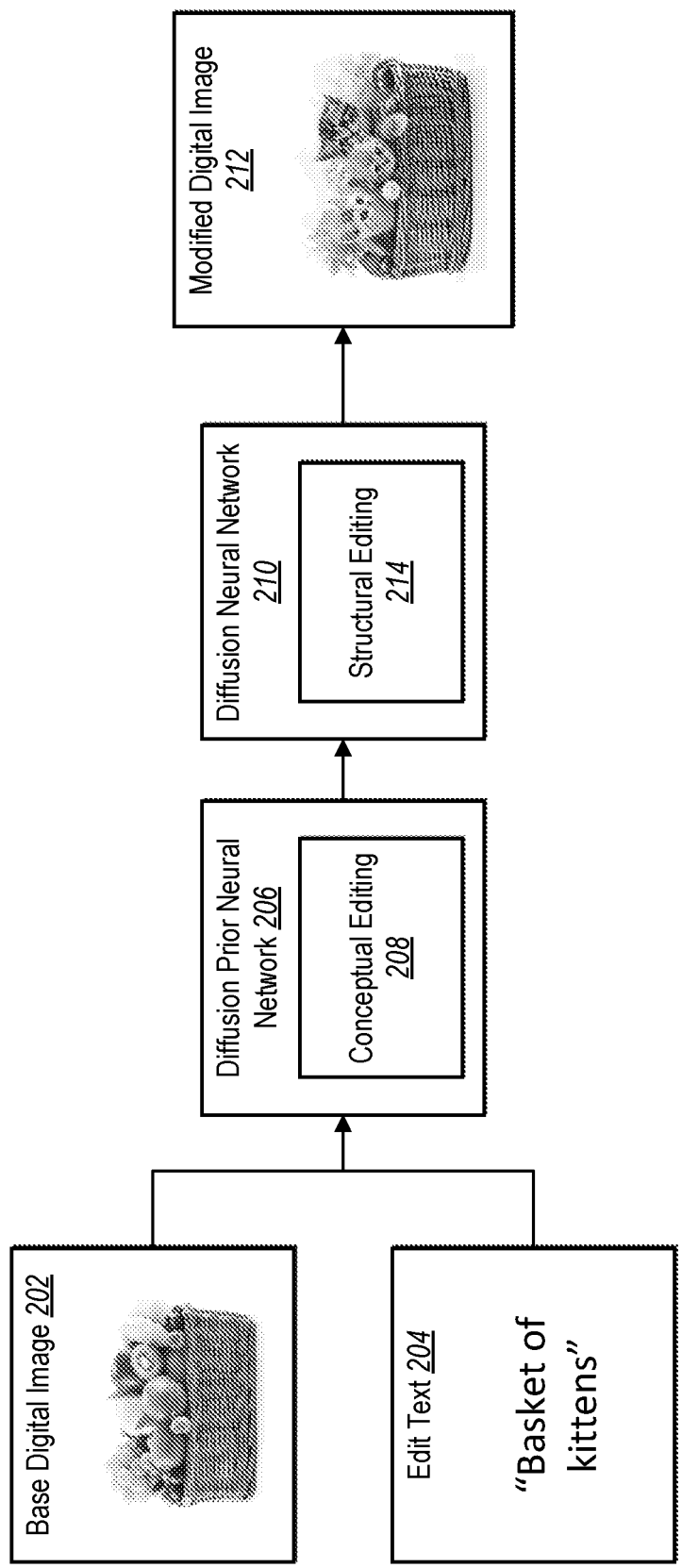
FIG. 2 illustrates generating a modified digital image from a base digital image and edit text utilizing a diffusion prior neural network and a diffusion neural network in accordance with one or more embodiments.

As shown in FIG. 2, the diffusion prior image editing system 102 identifies a base digital image 202. The base digital image 202 includes a digital visual representation. The base digital image 202 can portray a variety of objects or subjects in a variety of formats. For example, the base digital image 202 can include a jpeg, a tiff, a pdf, or some other digital visual media format. Similarly, the base digital image 202 can include a frame of a digital video. The diffusion prior image editing system 102 can obtain the base digital image 202 from a variety of sources. For example, in some embodiments the diffusion prior image editing system 102 captures the base digital image 202 utilizing a camera device of a client device. In some implementations the diffusion prior image editing system 102 obtains the base digital image 202 from a repository of digital images (e.g., from a cloud storage repository).

As also illustrated in FIG. 2, the diffusion prior image editing system 102 also identifies the edit text 204. The edit text 204 includes a verbal description (e.g., of a characteristic, feature, or modification for a digital image). For example, the edit text 204 can include a textual description of a desired characteristic of the modified digital image 212. The diffusion prior image editing system 102 can identify the edit text 204 from a variety of different sources. For example, in some implementations the diffusion prior image editing system 102 receives the edit text 204 based on user interaction with a user interface of a client device. In some embodiments, the diffusion prior image editing system 102 obtains the edit text 204 from audio input via a client device. For example, the diffusion prior image editing system 102 converts audio input to a textual input utilizing a transcription model.

As shown in FIG. 2 the diffusion prior image editing system 102 utilizes a diffusion prior neural network 206 and the diffusion neural network 210 to convert the base digital image 202 and the edit text 204 to the modified digital image 212. In particular, the diffusion prior image editing system 102 utilizes the diffusion prior neural network 206 to perform conceptual editing 208. As used herein, the term neural network refers to a machine learning model of interconnected artificial neurons (e.g., organized in layers) that communicate and learn to approximate complex functions and generate outputs. In some cases, a neural network refers to an algorithm (or set of algorithms) that implements deep learning techniques to model high-level abstractions in data.

For example, a neural network can include a convolutional neural network, a recurrent neural network (e.g., an LSTM), a graph neural network, or a generative adversarial neural network.

A diffusion model (or diffusional neural network) refers to a likelihood-based model for image synthesis. In particular, a diffusion model is based on a Gaussian denoising process (e.g., based on a premise that the noises added to the original images are drawn from Gaussian distributions). The denoising process involves predicting the added noises using a neural network (e.g., a convolutional neural network such as UNet). During training, Gaussian noise is iteratively added to a digital image in a sequence of steps (often referred to as timesteps) to generate a noise map. The neural network is trained to recreate the digital image by reversing the noising process. In particular, the neural network utilizes a plurality of steps (or timesteps) to iteratively denoise the noise map. The diffusion neural network can thus generate digital images from noise maps.

In some implementations, the diffusion neural network utilizes a conditioning mechanism to condition the denoising layers for adding edits or modifications in generating a digital image from the noise map/inversion. In conditional settings, diffusion models can be augmented with classifier or non-classifier guidance. Diffusion models can be conditioned on texts, images, or both. Moreover, diffusion models/neural networks include latent diffusion models. Latent diffusion models are diffusion models that utilize latent representations (e.g., rather than pixels). For example, a latent diffusion model includes a diffusion model trained and sampled from a latent space (e.g., trained by noising and denoising encodings or embeddings in a latent space rather than noising and denoising pixels). The diffusion prior image editing system can utilize a variety of diffusion models. For example, in one or more embodiments, the diffusion prior image editing system utilizes a latent diffusion model described by Robin Rombach, Andreas Blattmann, Dominik Lorenz, Patrick Esser, and Björn Ommer. High-resolution image synthesis with latent diffusion models. arXiv:2112.10752, 2021 (hereinafter "LDM"), which is incorporated by reference herein in its entirety. Similarly, in some embodiments, the diffusion prior image editing system utilizes a diffusion model architecture described by Aditya Ramesh, Prafulla Dhariwal, Alex Nichol, Casey Chu, and Mark Chen. Hierarchical text-conditional image generation with clip latents. arXiv:2204.06125, 2022 (hereinafter "Hierarchical text-conditional image generation"), which is incorporated by reference herein in its entirety.

As shown in FIG. 2, the diffusion prior image editing system 102 can perform conceptual editing 208 utilizing the diffusion prior neural network 206. The conceptual editing 208 can include combining features of the base digital image 202 and the edit text 204. For example, as described in greater detail below in relation to FIG. 3 and FIG. 4 the diffusion prior image editing system 102 can generate an image embedding utilizing a trained text-image encoder from the base digital image 202. Similarly, the diffusion prior image editing system 102 can generate an edit text embedding utilizing the trained text-image encoder from the edit text 204. The diffusion prior neural network 206 can inject the base image embedding to a dynamically selected conceptual editing denoising step of the diffusion prior neural network 206 and condition subsequent steps of the diffusion prior neural network 206 based on the edit text embedding. Utilizing this approach, the diffusion prior image editing system 102 can generate a text-edited image embedding utilizing the diffusion prior neural network 206.

The diffusion prior neural network 206 includes a diffusion model that generates a conditioning mechanism for another diffusion model. For example, a diffusion prior neural network includes a model that uses a diffusion process to generate a conditioning embedding from an input. In some implementations, a diffusion prior neural network generates an image embedding (e.g., a CLIP image embedding) from random noise, conditioned on a text embedding (e.g., a CLIP text embedding). In some implementations the diffusion prior neural network uses a Causal Transformer architecture as described in Hierarchical text-conditional image generation. In one or more implementations, the diffusion prior image editing system 102 trains the diffusion prior neural network utilizing the Large-scale Artificial Intelligence Open Network ("LAION").

The diffusion prior image editing system 102 can perform the structural editing 214 by dynamically selecting a structural transition step. In particular, the diffusion prior image editing system 102 can select a structural transition step of the diffusion neural network 210 that determines the number of noising steps and/or denoising steps in generating the modified digital image 212. The diffusion prior image editing system 102 can utilize denoising steps of the diffusion neural network 210 following the structural transition denoising step to process a representation of the base digital image 202. The diffusion prior image editing system 102 can intelligently select the structural transition denoising step to control the preservation of details from the base digital image 202 in generating the modified digital image 212. Additional detail regarding utilizing the diffusion neural network 210 to perform structural editing 214 is provided below in relation to FIG. 3 and FIG. 5.

In addition, as shown in FIG. 2 the diffusion prior image editing system 102 can utilize the diffusion neural network 210 to implement structural editing 214. For example, the diffusion prior image editing system 102 can perform structural editing 214 by dynamically controlling the degree/extent to which the modified digital image 212 reflects structure of the base digital image 202 (or the degree/extent to which the diffusion neural network 210 can deviate from the base digital image 202). In particular, the diffusion prior image editing system 102 can dynamically select a structural transition step of the diffusion neural network 210 that varies the amount of structure to retain from the base digital image 202. Additional detail regarding structure editing is provided below (e.g., in relation to FIGS. 3 and 5).

Figure 3:
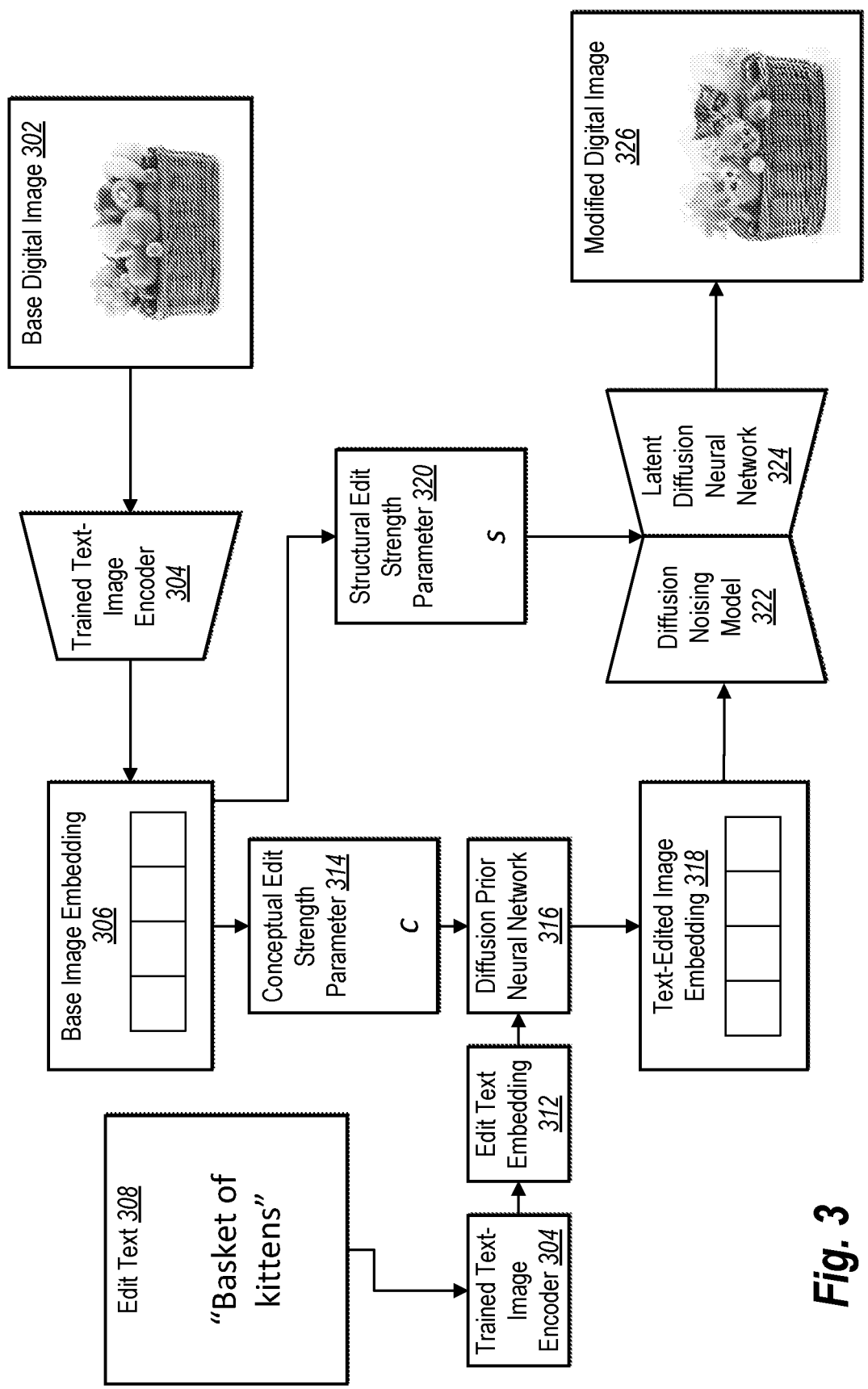
FIG. 3 illustrates generating a modified digital image from a base digital image and edit text in accordance with one or more embodiments.

For instance, FIG. 3 illustrates additional detail regarding generating a modified digital image from a base digital image and edit text in accordance with one or more embodiments. In particular, FIG. 3 illustrates the diffusion prior image editing system 102 generating a modified digital image 326 from a base digital image 302 and edit text 308.

As shown in FIG. 3, the diffusion prior image editing system 102 utilizes a trained text-image encoder 304 to generate a base image embedding 306 from the base digital image 302. The trained text-image encoder 304 includes a machine learning model trained to generate text embeddings and image embeddings in a common feature space. In particular, the trained text-image encoder 304 includes a neural network contrastively trained on text and image inputs to determine similarities between text and images. Based on this contrastive training, the text-image encoder can generate embeddings for images and/or text within a common feature space, where distance in the common feature space indicates semantic similarity. For instance, in one or more embodiments, the diffusion prior image editing system 102 utilizes a Contrastive Language-Image Pretraining ("CLIP") model to generate CLIP embeddings (e.g., CLIP L/14 embeddings).

As shown in FIG. 3, in some embodiments the diffusion prior image editing system 102 utilizes the trained text-image encoder 304 to generate a base image embedding 306. The base image embedding 306 includes an encoding, embedding, or other representation of the base digital image 302. For example, the base image embedding 306 can include a vector representation of the base digital image 302 upon processing of the base digital image 302 utilizing the trained text-image encoder 304 (e.g., a CLIP L/14 image embedding).

As shown in FIG. 3, the diffusion prior image editing system 102 also utilizes the trained text-image encoder 304 to generate an edit text embedding 312 from the edit text 308. As mentioned above, the edit text 308 includes a description of a desired modification, characteristic, or feature of a digital image. The diffusion prior image editing system 102 can utilize the trained text-image encoder 304 to generate the edit text embedding 312 that reflects characteristics or features of the edit text 308. Accordingly, the edit text embedding 312 comprises an encoding, embedding, or representation of the edit text 308. In particular, the edit text embedding 312 can include a vector representation of the edit text 308 upon processing of the edit text 308 utilizing the trained text-image encoder 304 (e.g., a CLIP L/14 text embedding).

As illustrated in FIG. 3, the diffusion prior image editing system 102 utilizes the diffusion prior neural network 316 to analyze the base image embedding 306 and the edit text embedding 312 to generate the text-edited image embedding 318. As described in relation to FIG. 2, the diffusion prior neural network 316 includes a neural network that generates a prior representation of input signals for future processing by a diffusion neural network.

The diffusion prior image editing system 102 can control the diffusion prior neural network 316 based on a conceptual edit strength parameter 314. The conceptual edit strength parameter 314 includes a metric, measure, or weight indicating a balance or trade-off between input signals. For example, the conceptual edit strength parameter 314 can include a balancing metric or weight relative to the edit text 308 and or the base digital image 302. In some implementations the conceptual edit strength parameter 314 is a normalized value between zero and one (or another range, such as 0 to 100). In some implementations, the conceptual edit strength parameter 314 reflects an internal characteristic or feature of the diffusion prior neural network 316. For example, the conceptual edit strength parameter 314 can include a conceptual edit step of the diffusion prior neural network 316. Similarly, the conceptual edit strength parameter 314 can include a number of steps of the diffusion prior neural network 316 utilized to generate the text-edited image embedding 318. Additional detail regarding the conceptual edit strength parameter 314 and the diffusion prior neural network 316 is provided below in relation to FIG. 4.

As shown in FIG. 3, the diffusion prior image editing system 102 utilizes the diffusion prior neural network 316 to generate the text-edited image embedding 318. The text-edited image embedding 318 includes an encoding, embedding, or representation of the edit text 308 and the base digital image 302. Thus, the text-edited image embedding 318 can include a combination of the trained text-image encoder 304 and the base image embedding 306 according to the learned parameters of the diffusion prior neural network 316.

As illustrated in FIG. 3, the diffusion prior image editing system 102 can also analyze the text-edited image embedding 318 and the base image embedding 306 utilizing a latent diffusion neural network 324 (i.e., a diffusion decoder) and a diffusion noising model 322. The diffusion noising model 322 includes a computer-implemented model that adds noise to an input. In particular, the diffusion noising model 322 can include a plurality of noising steps or layers that iteratively add additional noise to an input.

The diffusion noising model 322 can include a variety of computer implemented models or architectures. For example, in some embodiments the diffusion noising model 322 includes a reverse diffusion neural network. As described above, a diffusion neural network can iteratively denoise a noise map to generate a digital image. A reverse diffusion neural network utilizes a neural network to predict noise that, when analyzed by a diffusion neural network, will result in a particular (e.g., deterministic) digital image. Thus, a reverse diffusion neural network includes a neural network that iteratively adds noise to an input signal that will reflect a deterministic outcome or result when processed through denoising layers of a diffusion neural network. The diffusion prior image editing system 102 can utilize a variety of reverse diffusion neural networks. For example, in one or more implementations, the diffusion prior image editing system 102 utilizes the architecture described by Jiaming Song, Chenlin Meng, and Stefano Ermon. Denoising diffusion implicit models. arXiv:2010.02502, 2020 (hereinafter Reverse DDIM), which is incorporated herein by reference in its entirety.

In addition to a reverse diffusion neural network, the diffusion prior image editing system 102 can also utilize other architectures for the diffusion noising model 322. For example, in some implementations the diffusion prior image editing system 102 can utilize a diffusion model that iteratively adds noise to an input signal utilizing a stochastic or other statistical process. To illustrate, in some embodiments the diffusion prior image editing system 102 utilizes a diffusion noising model as described by Chenlin Meng, Yutong He, Yang Song, Jiaming Song, Jiajun Wu, Jun-Yan Zhu, and Stefano Ermon, Sdedit: Guided image synthesis and editing with stochastic differential equations, 2021.

The diffusion prior image editing system 102 can utilize the diffusion noising model 322 to process the text-edited image embedding 318. In one or more embodiments, the diffusion noising model 322 processes the base image embedding 306 through a plurality of noising steps to generate a base image noise map. The base image noise map comprises a noisy representation of the base digital image 302. In particular, the base image noise map can include a noisy representation of the base image embedding 306 after processing by the diffusion noising model 322.

As shown in FIG. 3, the diffusion prior image editing system 102 utilizes the latent diffusion neural network 324 to generate the modified digital image 326 from the base image embedding 306 and the text-edited image embedding 318. In particular, the latent diffusion neural network 324 utilizes the base image noise map generated by the diffusion noising model 322 to generate the modified digital image 326. To illustrate, in some implementations the latent diffusion neural network 324 analyzes the base image noise map through a plurality of denoising steps. Moreover, at each of these denoising steps the diffusion prior image editing system 102 conditions the diffusion neural network utilizing the text-edited image embedding 318. Accordingly, the latent diffusion neural network 324 iteratively modifies intermediate representations of the base image embedding 306 utilizing the text-edited image embedding 318.

As shown in FIG. 3, the diffusion prior image editing system 102 can also modify operation of the latent diffusion neural network 324 according to a structural edit strength parameter 320. The structural edit strength parameter 320 includes a metric, measure, or weight corresponding to the base digital image 302. In particular, the structural edit strength parameter 320 can include a weight indicating the extent or degree to which the latent diffusion neural network 324 will preserve structure, characteristics, or features of the base digital image 302. The structural edit strength parameter 320 can include a variety of formulations. For example, the structural edit strength parameter 320 can include a normalized value between zero and one (or some other range, such as zero to five). In some implementations, the structural edit strength parameter 320 can indicate a parameter or feature of the latent diffusion neural network 324 and/or the diffusion noising model 322. For example, in some implementations the structural edit strength parameter 320 indicates a structural transition step of the diffusion noising model 322 and/or the latent diffusion neural network 324. To illustrate, the structural edit strength parameter 320 can include a structural number indicating the number of noising steps and/or the number of denoising steps of the latent diffusion neural network 324.

For example, the diffusion prior image editing system 102 can select a subset of noising steps or denoising steps that are available within the diffusion noising model 322 and/or the latent diffusion neural network 324 based on the structural edit strength parameter 320. By selecting the structural number of noising steps and denoising steps, the diffusion prior image editing system 102 can control the extent to which the latent diffusion neural network 324 will generate a modified digital image 326 that reflects the structural components of the base digital image 302. Additional detail regarding structural control within the latent diffusion neural network 324 is provided below in relation to FIG. 5.

As shown in FIG. 3, the latent diffusion neural network 324 generates the modified digital image 326. As illustrated, the modified digital image 326 portrays features from the base digital image 302 as modified by the edit text 308. In particular, the modified digital image 326 portrays a basket having the same texture, color, arrangement, and orientation of the base digital image 302 with contents that reflect the edit text 308. Specifically, the modified digital image 326 replaces fruit from the base digital image 302 with kittens indicated in the edit text 308. Notably, the modified digital image 326 is a realistic and accurate portrayal of the edit text 308 while maintaining fidelity to the structure of the base digital image 302.

Thus, in one or more implementations, the diffusion prior image editing system 102 is built on a pre-trained hierarchical diffusion model. It uses a diffusion prior model to perform a conceptual edit of the CLIP embedding of the base image $x_b$ followed by a structural edit using a diffusion decoder. The inputs are the base image $x_b$ and edit text/prompt $y_e$ and the output is the edited image $x_e$.

As mentioned above, in some implementations the diffusion prior image editing system 102 generates a text-edit image embedding based on a base image embedding and an edit text embedding utilizing a plurality of layers or steps of a diffusion prior neural network. For example, FIG. 4 illustrates the diffusion prior image editing system 102 utilizing a set of steps 412 of a diffusion prior neural network 416 to generate a text-edited image embedding 406 from a base image embedding 402 and edit text embedding 404.

Figure 4:
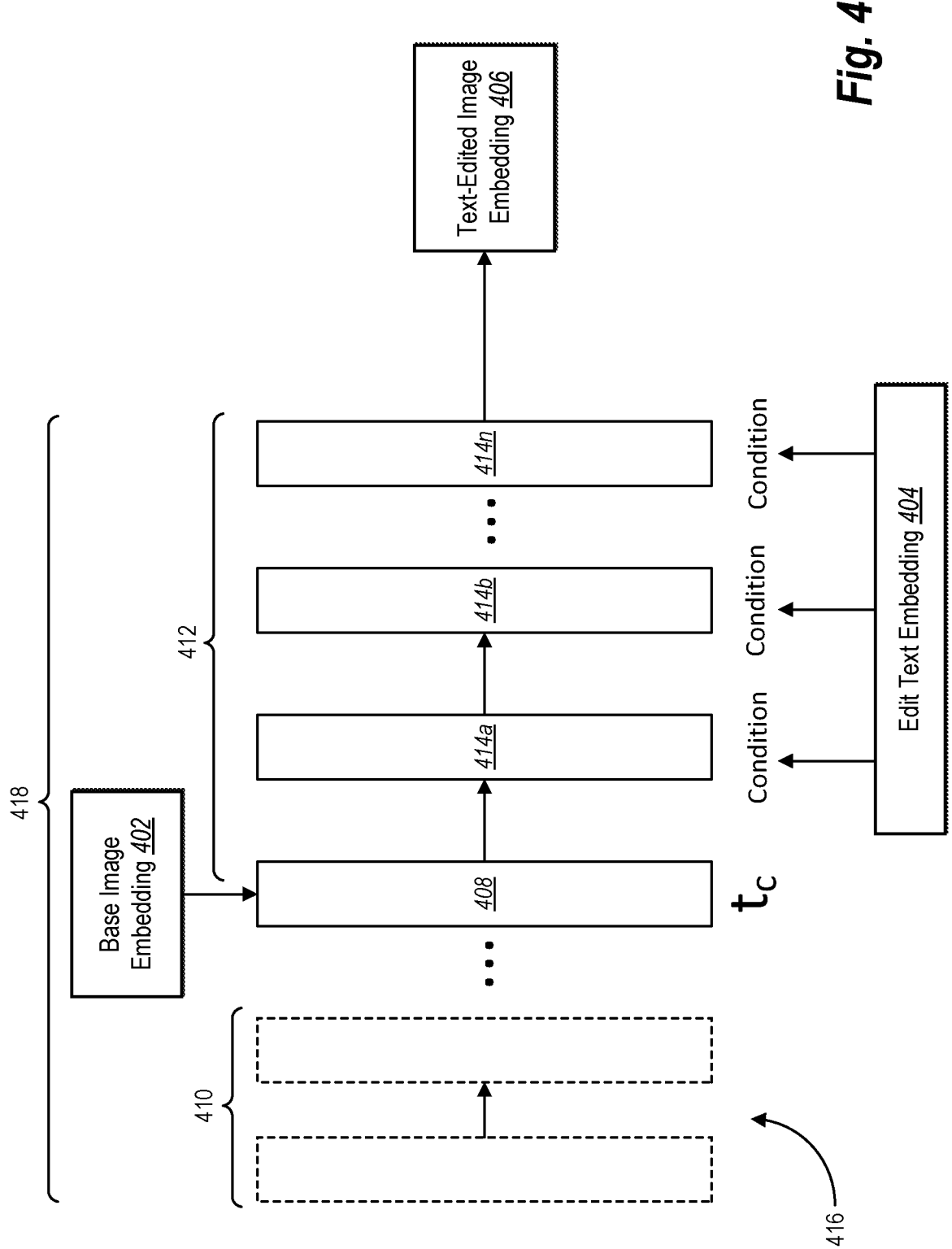
FIG. 4 illustrates performing a conceptual editing step of a diffusion prior neural network for controlling the conceptual editing of a modified digital image in accordance with one or more embodiments.

Specifically, FIG. 4 illustrates performing a conceptual editing step of the diffusion prior neural network 416 for controlling the conceptual editing of a modified digital image.

As shown in FIG. 4 the diffusion prior neural network 416 includes a plurality of steps 418 (i.e., denoising steps), including a first set of steps 410 and a second set of steps 412. The diffusion prior image editing system 102 selects a conceptual editing step 408 to inject a base image embedding 402 (e.g., the base image embedding 306 discussed above). The diffusion prior image editing system 102 then utilizes the second set of steps 412 to generate the text-edited image embedding 406. Specifically, the diffusion prior image editing system 102 injects the base image embedding 402 at the conceptual editing step 408 and then utilizes the second set of steps 412 to convert the base image embedding 402 into the text-edited image embedding 406.

To illustrate, the diffusion prior image editing system 102 processes the base image embedding 402 utilizing the conceptual editing step 408 to generate an intermediate embedding. The diffusion prior image editing system 102 then processes the intermediate embedding by an additional step 414a of the diffusion prior neural network 316. The diffusion prior image editing system 102 iteratively repeats this process through the remaining steps 414b-414n to generate the text-edited image embedding 406.

Moreover, as shown in FIG. 4, the diffusion prior image editing system 102 conditions the second set of steps 412 of the diffusion prior neural network 416 utilizing the edit text embedding 404. Thus, upon generating an intermediate embedding from the base image embedding 402 utilizing the conceptual editing step 408, the diffusion prior image editing system 102 conditions the additional step 414a on the edit text embedding 404. Moreover, for the subsequent intermediate representations processed by the remaining steps 414b-414n the diffusion prior image editing system 102 also conditions the intermediate steps 414b-414n on the edit text embedding 404. Accordingly, the text-edited image embedding 406 reflects a combination of the base image embedding 402 and the edit text embedding 404.

Notably, the degree to which the diffusion prior neural network 416 modifies the base image embedding 402 utilizing the edit text embedding 404 depends on the number of steps in the second set of steps 412. In other words, selection of the conceptual editing step 408 within the plurality of steps 418 of the diffusion prior neural network 416 controls the balance of the base image embedding 402 relative to the edit text embedding 404. The more layers in the second set of steps 412, the more that the text-edited image embedding 406 will reflect the edit text embedding 404. Conversely, the fewer the number of steps in the second set of steps 412 the less impact the edit text embedding 404 will have on the text-edited image embedding 406.

As discussed above in relation to FIG. 3, the diffusion prior image editing system 102 selects the conceptual editing step 408 based on a conceptual editing strength parameter. In particular, the conceptual editing strength parameter controls the layer of the diffusion prior neural network 416 that the diffusion prior image editing system 102 utilizes to inject the base image embedding 402. Thus, the conceptual editing strength parameter selects the location within the plurality of steps 418 of the diffusion prior neural network 416 that the diffusion prior image editing system 102 will utilize to inject the base image embedding 402. Accordingly, the conceptual edit strength parameter indicates the first set of steps 410 and the second set of steps 412 (i.e., the number of steps in the second set of steps 412 that will be conditioned by the edit text embedding 404).

To illustrate, consider a circumstance where the diffusion prior neural network 416 has 100 steps. Moreover, in this circumstance, the diffusion prior image editing system 102 receives a conceptual edit strength parameter of 0.5. The diffusion prior image editing system 102 can convert the conceptual edit strength parameter to a conceptual editing step of the diffusion prior neural network 416. In other words, the diffusion prior image editing system 102 can convert the conceptual edit strength parameter to select the first set of steps 410 and the second set of steps 412. In relation to the present example of 100 steps, the diffusion prior image editing system 102 can select the conceptual editing step as the 50th step in the diffusion prior neural network 416. Thus, the number of steps in the second set of steps 412 would be 50 and the number of steps in the first set of steps 410 would be 50.

Upon receiving a different conceptual edit strength parameter, the diffusion prior image editing system 102 can select a different conceptual editing step (i.e., a different number of steps in the first set of steps 410 and a different number of steps in the second set of steps 412). For example, upon receiving a conceptual edit strength parameter of 0.7 the diffusion prior image editing system 102 can select the 70th step as the conceptual editing step (which would leave 30 steps in the first set of steps and 70 steps in the second set of steps). Although the foregoing examples utilize a particular number of steps in a particular representation of the conceptual edit strength parameter, the diffusion prior image editing system 102 can utilize a variety of different steps in a variety of different parameters.

Moreover, although the foregoing description of FIG. 4 focuses on the second set of steps 412, in one or more embodiments, the diffusion prior image editing system 102 still utilizes the first set of steps 410. For instance, in some implementations the first set of steps 410 are utilized to generate intermediate embeddings. For example, the first set of steps 410 can process an input noise to generate an intermediate noise map that is then combined with the base image embedding 402 at the conceptual editing step 408 in the second set of steps 412. In some embodiments, the diffusion prior image editing system 102 does not use the first set of steps 410.

Thus, in one or more embodiments, the diffusion prior image editing system 102 performs the conceptual edit image process by utilizing the diffusion prior model to modify a CLIP L/14 embedding $z_b$ of the input image $x_b$ to another embedding $z_e$ by conceptually imitating the process of moving the base embedding along the direction specified by the edit text $y_e$ in CLIP embedding space. The diffusion prior image editing system 102 injects $x_b$ into the diffusion prior model $\mathcal{P}_e$ at some intermediate timestep $t_c$ during sampling and runs the remaining sampling steps from $t_c$ to 0 while conditioning on the CLIP text embedding $z_y$ of the edit text prompt $y_e$. Utilizing this approach, the resulting image embedding $z_e$ has context from both the base image and the edit prompt. This process is depicted in Equation 1 where $p_\theta(x_{t-1}|x_t)$ depicts a single DDIM sampling step starting from timestep $t_c$ instead of T and $z_{t_c}=z_b$.

$$p_\theta(z_e \mid z_b, z_y) = \prod_{t=1}^{t_c} p_\theta(z_{t-1} \mid z_t, z_y) \quad \text{(Eq. 1)}$$

The higher the value of $t_c$, the greater number of steps the prior gets to modify the injected embedding according to edit text and the closer the generated embedding will be to the edit text. In one or more implementations, the diffusion prior image editing system 102 controls the injection timestep the using a conceptual edit strength parameter $c \in [0,1]$ and $t_c = T \times c$. The higher the value of c, the more the base embedding $z_b$ will be modified.

The diffusion prior model $\mathcal{P}_\theta$ generates a normalized CLIP image embedding $z_x$ from random noise conditioned on a text prompt $y_e$. In particular, in one or more embodiments, the diffusion prior $\mathcal{P}_\theta(z_x|y)$ parameterized by θ is a Causal Transformer that takes as input a random noise sampled from $\mathcal{N}(0,I)$ and a CLIP text embedding $z_y=[z_r, w_1, w_2, \ldots, w_n]$ where $z_r$ is the l2 normalized text embedding while $w_i$ is the per token encoding, both from a pretrained CLIP L/14 text encoder. In one or more implementations, the diffusion prior image editing system 102 leverages the diffusion prior model trained by LAION that generates normalized CLIP L/14 embeddings conditioned on text. In one or more embodiments, the diffusion prior image editing system 102 trains the diffusion prior generate an l2 normalized CLIP L/14 image embedding, given a text prompt. For example, the diffusion prior image editing system 102 trains the LAION prior using the code on LAION data with ground truth $z_y$ and $z_x$ from text-image (y,x) pairs using a setup and MSE objective as denoising diffusion models described in Hierarchical text-conditional image generation with clip latents.

As mentioned previously, the diffusion prior image editing system 102 can also perform structural editing within a diffusion neural network to generate a modified digital image. For example, FIG. 5 illustrates utilizing a diffusion neural network 524 to generate a modified digital image 506 through structural editing of a base image embedding 502 and a text-edited image embedding 504 in accordance with one or more embodiments.

Figure 5:
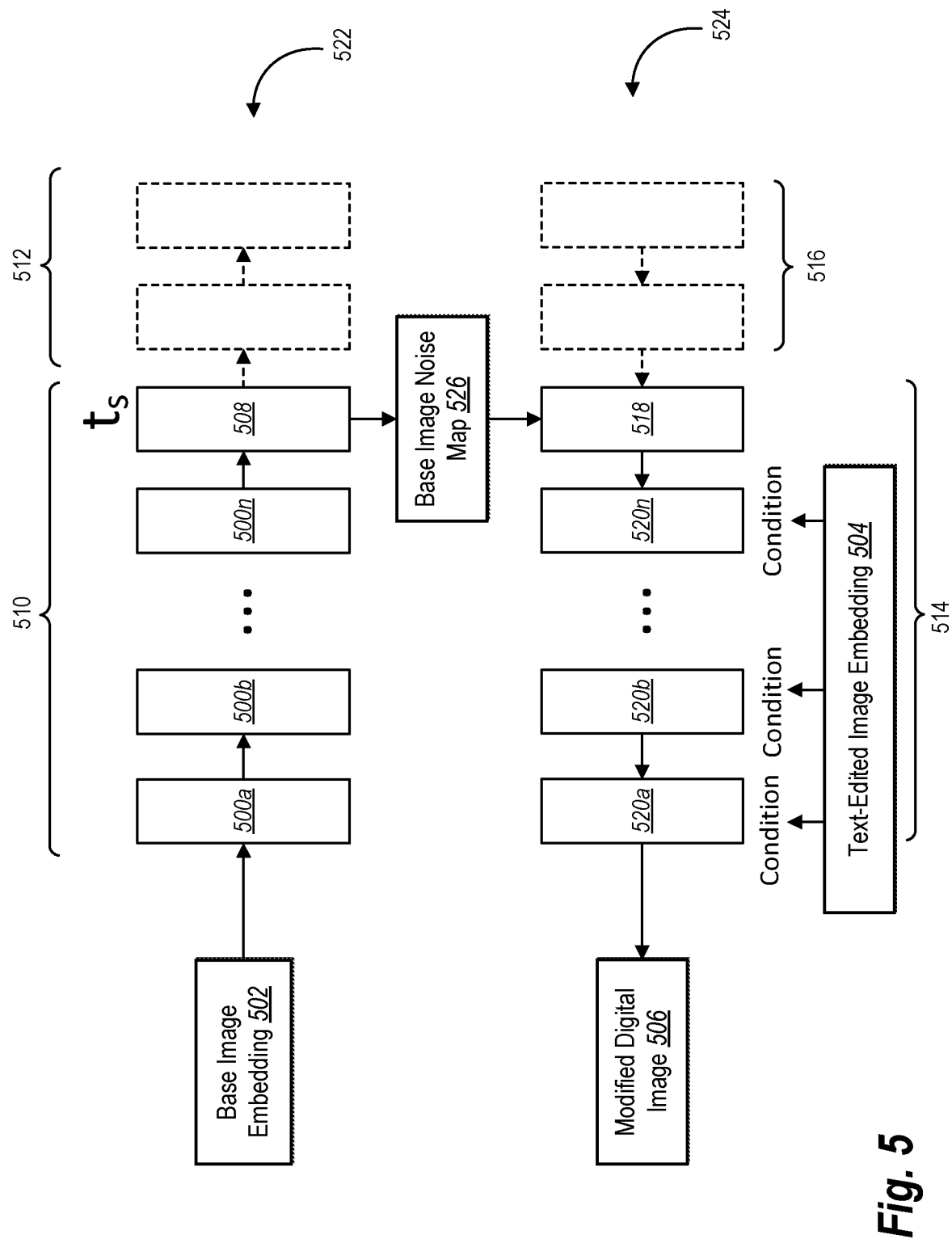
FIG. 5 illustrates utilizing a diffusion neural network to generate a modified digital image through structural editing of a base image embedding and a text-edited image embedding in accordance with one or more embodiments.

Specifically, FIG. 5 illustrates the diffusion prior image editing system 102 accessing a base image embedding 502 (e.g., the base image embedding 306 described in relation to FIG. 3). As illustrated, the diffusion prior image editing system 102 processes the base image embedding 502 through noising steps of the diffusion noising model 522. In particular, as shown the diffusion noising model 522 includes a plurality of noising steps that include a first set of noising steps 510 and a second set of noising steps 512. As illustrated, the first set of noising steps culminate in a structural noising transition step 508.

As shown in FIG. 5, the diffusion prior image editing system 102 utilizes the first set of noising steps 510 to process the base image embedding 502 through the structural noising transition step 508 to generate a base image noise map 526. Specifically, the diffusion prior image editing system 102 utilizes a first noising step 500*a* to generate an intermediate noise map from the base image embedding 502. The diffusion prior image editing system 102 then processes the intermediate noise map utilizing the second noise step 500*b*. The diffusion prior image editing system 102 iteratively generates intermediate noise maps (through noising step 500*n*) until processing a final intermediate noise map utilizing the structural noising transition step 508. In this manner, the diffusion prior image editing system 102 can generate the base image noise map 526 at the structural noising transition step 508 utilizing the first set of noising steps 510.

As illustrated in FIG. 5, the diffusion prior image editing system 102 can also utilize the diffusion neural network 524 to generate the modified digital image 506 from the base image noise map 526. In particular, as shown the diffusion neural network 524 includes a plurality of denoising steps including a first set of denoising steps 514 and a second set of denoising steps 516. As illustrated, the first set of denoising steps 514 includes a structural transition denoising step 518 and an additional plurality of denoising steps 520a-520n.

Thus, the diffusion prior image editing system 102 utilizes the structural transition denoising step 518 to generate an intermediate noise map from the base image noise map 526. The diffusion prior image editing system 102 utilizes in additional denoising step 520n to generate another intermediate denoising map from the intermediate noising map. The diffusion prior image editing system 102 iteratively performs this process through the first set of denoising steps 514 to generate the modified digital image 506. Notably, at each step of the first set of noising steps 510 the diffusion prior image editing system 102 can condition the denoising step utilizing the text-edited image embedding 504. Thus, as shown the diffusion prior image editing system 102 conditions the denoising step 520n based on the text-edited image embedding 504. Moreover, the diffusion prior image editing system 102 conditions the remaining denoising steps based on the text-edited image embedding 504.

As shown in FIG. 5, the structural number of noising steps within the first set of noising steps 510 dictates the amount of noise added to the base image embedding 502. The structural number of noising steps also can correspond to a structural number of denoising steps in the first set of denoising steps 514. Accordingly, the structural number of denoising steps indicates the degree or amount to which the diffusion neural network 524 will modify the base image noise map 526 utilizing the text-edited image embedding 504. The larger the structural number of steps in the first set of noising steps 510 the more noise will be added to the representation of the base digital image reflected in the base image embedding 502 and the less structural control the base digital image will have in the modified digital image 506. Conversely, the smaller the structural number of steps in the first set of noising steps 510, the less noise that is added the base image embedding 502 and the more structural control the base digital image will exert on the modified digital image 506.

As mentioned previously the diffusion prior image editing system 102 can utilize a structural edit strength parameter to control the structural transition step and therefore the structural number of noising steps and the structural number of denoising steps. Specifically, the structural edit strength parameter indicates the structural transition step 508, the first set of noising steps 510, the second set of noising steps 512, the first set of denoising steps 514, and the second set of denoising steps 516.

To illustrate, consider a denoising neural network with 100 denoising steps and a structural edit strength parameter of 0.5. In one or more implementations, this configuration would result in a structural transition step at the 50th noising step of the diffusion noising model 522 and a structural transition denoising step at the 50th denoising step of the diffusion neural network 524. Similarly, in one or more implementations this configuration would result in 50 steps in the first set of steps 510, 50 steps in the second set of noising steps 512, 50 steps in the first set of denoising steps 514, and 50 steps in the second set of denoising steps 516. In other words, the diffusion prior image editing system 102 can select 50 as the structural number of noising steps and the structural number of denoising steps.

In one or more embodiments, upon receiving an additional structural edit strength parameter of 0.3 the diffusion prior image editing system 102 selects a different structural transition step (i.e., a different structural number of steps). For example, the diffusion prior image editing system 102 can select a structural transition step 508 at the 30th noising step of the diffusion noising model 522 and select the structural transition step 518 at the 30th denoising step of the diffusion neural network 524. Moreover, the diffusion prior image editing system 102 can select 30 steps in the first set of steps 510 and 70 steps in the second set of noising steps 512 of the diffusion noising model 522. In addition, the diffusion prior image editing system 102 can select 30 denoising steps in the first set of denoising steps 514 and 70 denoising steps in the second set of denoising steps 516. In other words, the diffusion prior image editing system 102 can select 30 as the structural number of noising steps and 30 as the structural number of denoising steps. The result of this configuration change from 50 to 30 in the structural number would mean that the diffusion neural network 524 would have fewer steps conditioned on the text-edited image embedding 504. Thus, the modified digital image 506 would more strongly represent structural characteristics of the base digital image as reflected in the base image noise map 526.

In one or more implementations, the diffusion prior image editing system 102 utilizes pretrained variational autoencoders (VAEs) as described by Hierarchical text-conditional image generation to convert VAE latents generated by the diffusion decoder to a pixel image. Thus, the diffusion prior image editing system 102 can utilize the diffusion prior model and diffusion decoder as a hybrid diffusion model (HDM) used for text-to-image generation. In one or more embodiments, the diffusion decoder $\mathcal{D}_\phi$ is a UNet based on LDM modified to take a single CLIP image embedding as conditioning to generate an image. Moreover, the diffusion prior image editing system 102 trains a diffusion decoder model.

Thus, in one or more embodiments the conceptual edit process described in relation to FIG. 4 gives a CLIP image embedding that has context from both the base image $x_b$ and edit text $y_e$. To generate the final edited image $x_e$, the diffusion prior image editing system 102 passes the generated edit embedding $z_e$ to the diffusion decoder. However, passing the embedding through the decoder can generate an image that may not preserve the structure of the base image due to the lack of spatial information in the generated CLIP embedding. Because the noise map $z_T$ sampled from standard normal is leveraged to fix structure within the first few steps of the reverse diffusion process, the diffusion prior image editing system 102 can perform structure preserving edits by starting from noise that deterministically generates the base image and modify the conditioning at later timesteps.

Thus, in one or more embodiments, the diffusion prior image editing system 102 utilizes a reverse diffusion neural network to get the noise by deterministically running the reverse of the reverse diffusion process on $z_0$ conditioned on the base image's CLIP embedding $z_b$. If $z_t$ represents the noised VAE latent at some timestep t, $\epsilon_\theta(z_t, t, z_b)$ is the noise prediction decoder UNet, and $f_\theta(z_t, t, z_b)$ is parameterized by the noise prediction network as $$\frac{1}{\sqrt{\alpha_t}}(z_t - \sqrt{1-\alpha_t})\epsilon_\theta(z_t, t, z_b),$$

then a single step of the reverse DDIM process with the diffusion decoder can be depicted as in Equation 2:

$$z_{t+1} = \sqrt{\alpha_t + 1} \cdot f_\theta(z_t, t, z_b) + \sqrt{1-\alpha_{t+1}} \cdot \epsilon_\theta(z_t, t, z_b) \quad \text{(Eq. 2)}$$

The reverse DDIM process starts from the base image's VAE latent $z_0 = VAE_{enc}(x_b)$. In one or more embodiments, the diffusion prior image editing system 102 uses a structural edit strength parameter $s \in [0,1]$ and $t_s = T \times s$ that controls the strength of structure preservation by specifying the timestep $t_s$ until which the diffusion prior image editing system 102 runs the reverse DDIM process. The larger the strength parameter s, the larger the timestep $t_s$ and noisier the base image becomes. Hence, increasing s corresponds to reducing the preserved structural information.

Upon obtaining the deterministic noised latent $z_{t_s}$, in one or more implementations the diffusion prior image editing system 102 runs the sampling process of the diffusion decoder starting from $t_s$ until 0, conditioned on the conceptually edited embedding $z_e$ to get the final edited latent $\hat{z}_e$. The generated VAE latent can then be passed through the pre-trained and fixed VAE decoder to get the final edited image $x_e$ as $x_e = VAE_{dec}(\hat{z}_e)$. As mentioned previously, the diffusion prior image editing system 102 can also apply this structural edit step using SDEdit or another diffusion noising model.

As mentioned previously in one or more embodiments the diffusion prior image editing system 102 can provide a user interface via a client device for providing base digital images, edit text, conceptual edit strength parameters, and/or structural edit strength parameters. For example, FIGS. 6A and 6B illustrate a user interface of a client device for controlling conceptual edit strength parameter and structural edit strings parameters in generating a modified digital image from a base digital image and edit text in accordance with one or more embodiments.

Figure 6A:
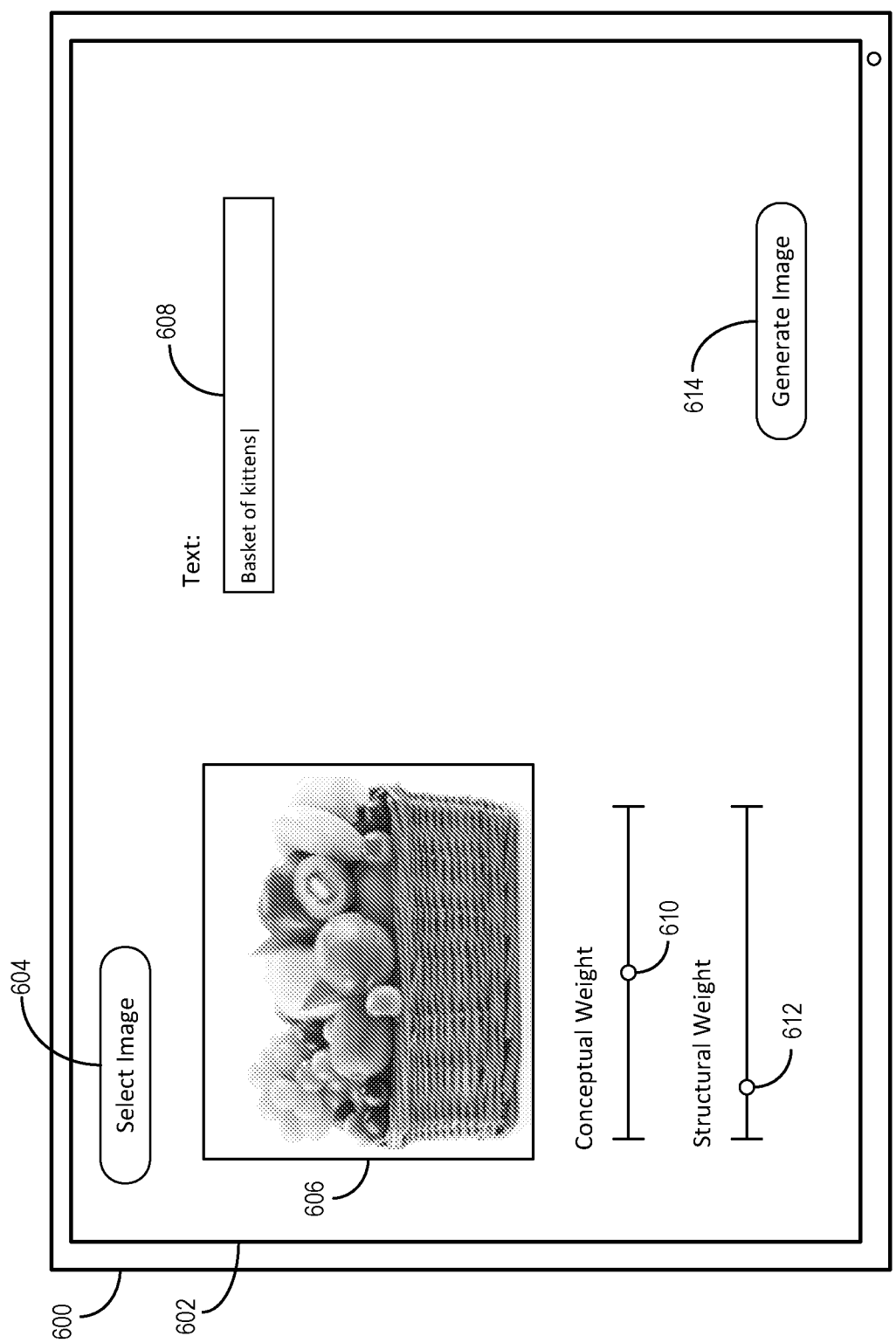
FIGS. 6A-6B illustrate a user interface for generating a modified digital image from a base digital image, edit text, conceptual edit strength parameter, and/or structural edit strength parameter in accordance with one or more embodiments.
Figure 6B:
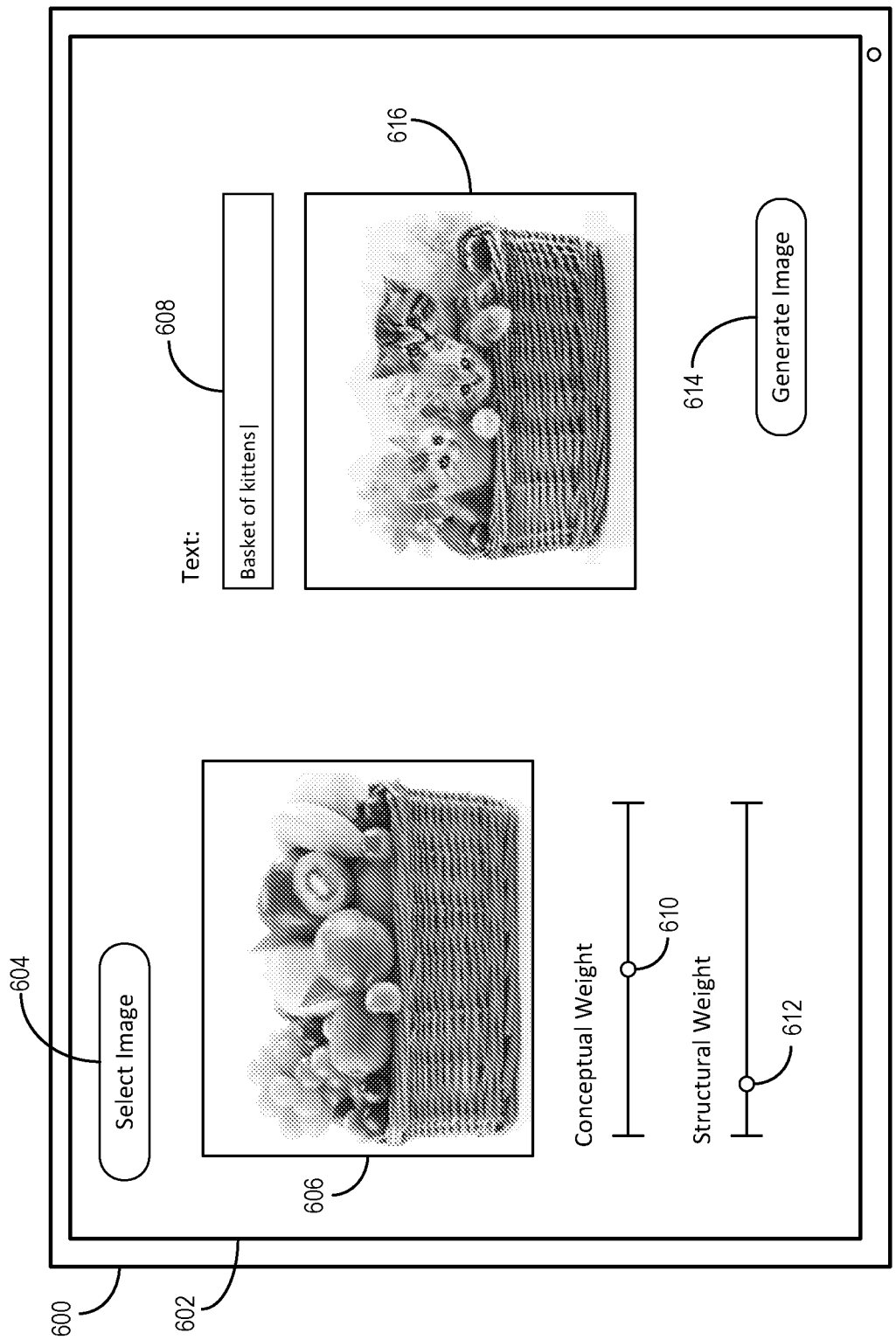

Specifically, FIG. 6A illustrates a screen of a client device 600 displaying a user interface 602. The user interface 602 includes a variety of user interface elements. In particular, the user interface 602 includes a select image element 604. Based on user interaction with the select image element 604, the diffusion prior image editing system 102 can provide additional user interface elements for selecting a base digital image. To illustrate, the diffusion prior image editing system 102 can provide a list of digital images stored on the client device 600 or a list of digital images stored remotely via a cloud repository. Similarly, based on user interaction with the select image element 604 the diffusion prior image editing system 102 can provide an option to capture a digital image utilizing a camera of the client device 600.

As shown in FIG. 6A, based on user interaction with the select image element 604, the diffusion prior image editing system 102 identifies a base digital image 606. Moreover, the diffusion prior image editing system 102 provides the base digital image 606 for display via the user interface 602.

In addition, the user interface 602 also includes an edit text element 608. The diffusion prior image editing system 102 can receive edit text for modifying the base digital image 606 via the edit text element 608. Although illustrated as a user interface element for receiving textual inputs, the edit text element 608 can include a variety of user interface elements including a selectable element for initiating audio input.

As shown in FIG. 6A, the user interface 602 also includes a conceptual weight element 610. Based on user interaction with the conceptual weight element the diffusion prior image editing system 102 can determine a conceptual edit strength parameter. Although illustrated in FIG. 6A as a slider element, the conceptual weight element 610 can include a variety of different user interface elements. In some embodiments, the diffusion prior image editing system 102 can identify a conceptual edit strength parameter without providing a conceptual weight element visibly in the user interface. For example, by selecting a portion of the screen closer to the base digital image 606 the system can emphasize the base digital image in the conceptual edit strength parameter. Alternatively, by receiving a user interface selection closer to the edit text element 608 can the diffusion prior image editing system 102 can modify the conceptual edit strength parameter to emphasize the edit text.

As illustrated, the user interface 602 also includes a structural weight element 612. Similar to the conceptual weight element 610, the diffusion prior image editing system 102 can determine a structural edit strength parameter based on user interaction with the structural weight element 612. Moreover, the diffusion prior image editing system 102 can also determine a structural edit strength parameter without providing a structural weight element for display via the user interface. Further, the structural weight element 612 can include a variety of user interface elements such as a text input element for selecting a number, a scroller element, or another element.

In relation to FIG. 6A, the user interface 602 also includes a generate image element 614. Based on user action with the generate image element 614, the diffusion prior image editing system 102 can generate a modified digital image based on the base digital image 606 and the edit text. Specifically, the diffusion prior image editing system 102 can determine a conceptual edit strength parameter based on user interaction with the conceptual weight element 610 and a structural edit strength parameter based on user interaction with the structural weight element 612. The diffusion prior image editing system 102 can then generate a modified digital image based on the base digital image 606, the edit text element 608, the conceptual edit strength parameter and the structural weight parameter, as described previously.

Indeed, FIG. 6B illustrates the user interface 602 generated by the diffusion prior image editing system 102 in response to user interaction with the generate image element 614. In particular, FIG. 6B illustrates the user interface 602 that includes a modified digital image 616. As shown, the modified digital image 616 reflects the base digital image 606 and the edit text according to the conceptual edit strength parameter and the structural edit strength parameter indicated by the conceptual weight element 610 and the structural weight element 612. Although not illustrated, the diffusion prior image editing system 102 can iteratively generate modified digital images as the diffusion prior image editing system 102 receives additional user interaction via the user interface 602. For example, in response to selection of a different base digital image, selection of different edit text, selection of a different conceptual edit strength parameter, and/or selection of a different structural edit strength parameter, the diffusion prior image editing system 102 can generate modified digital images and provide the modified digital images for display via the user interface 602.

In addition, although FIGS. 6A and 6B illustrate generating the modified digital image 616 based on user interaction with the generate image element 614, in one or more embodiments the diffusion prior image editing system 102 generates the modified digital image 616 without a generate image element (and/or without the conceptual weight element 610 and the structural weight element 612). For example, in response to selection of a base digital image and determining an edit text, the diffusion prior image editing system 102 can automatically generate a modified digital image. For example, if a client device captures a digital image and the diffusion prior image editing system 102 detects an audio input (e.g., "I wish that image showed cats instead of dogs"), the diffusion prior image editing system 102 can automatically generate a modified digital image that transforms the captured digital image based on the audio input.

As mentioned, above the diffusion prior image editing system 102 can improve conventional systems with regard to accuracy, efficiency, and flexibility. Indeed, researchers have conducted a variety of experiments to demonstrate improvements of example implementations of the diffusion prior image editing system 102 relative to conventional systems. For example, researchers performed a comprehensive qualitative comparison with existing baselines as well as ablations and alternatives for the proposed setup. The example implementation of the diffusion prior image editing system 102 is referred to as PRedItOR (or "Ours") in the following description.

As mentioned above, the structural edit step can be performed using a variety of models. For experimentation, researchers applied the reverse DDIM or SDEdit. These variants are identified as Ours (rDDIM) and Ours (SDEdit) respectively.

To illustrate the importance and effectiveness of the experimental conceptual edit step, researchers show results without the conceptual editing. In particular, researchers passed the edit text to the diffusion prior to generate an image embedding and then applied the structural edit step. Researchers utilizes the following notation:

Prior (SDEdit): This is Prior (rDDIM) but applies SDEdit during the structural edit step.

SD (SDEdit): This is Stable Diffusion with SDEdit using the edit text.

PRedItOR (SDEdit): This is the proposed two step PRedItOR process with SDEdit for structural edit. This could also be referred to as Ours (SDEdit).

PRedItOR: This is the proposed two step PRedItOR process with reverse DDIM for structural edit. Note that PRed-ItOR, PRedItOR (rDDIM), Ours and Ours (rDDIM) are all equivalent unless otherwise mentioned.

Figure 7A:
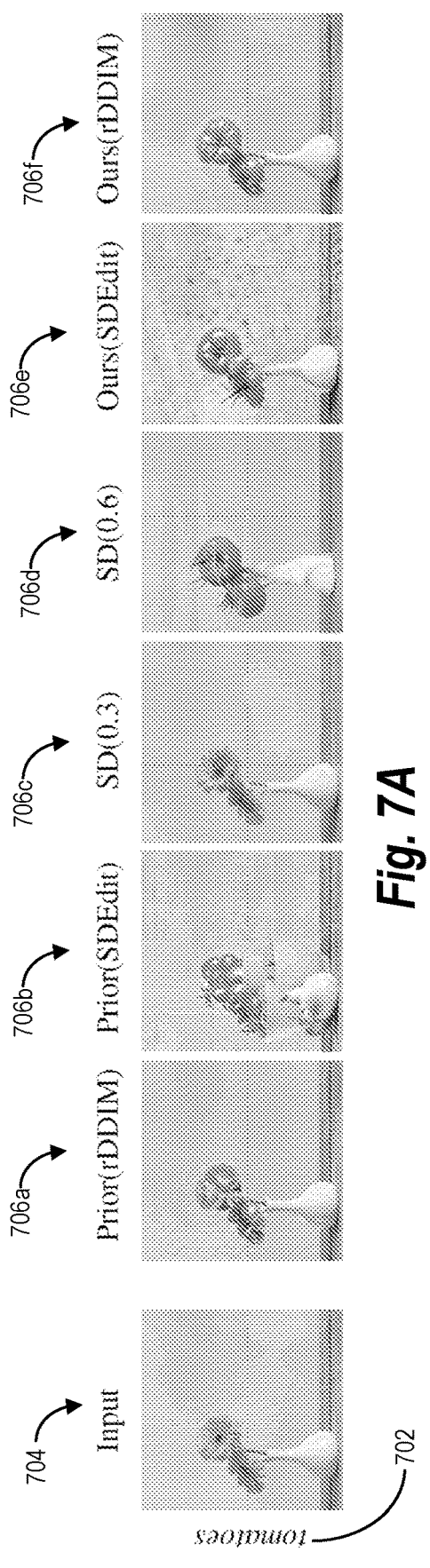
FIGS. 7A-7B illustrate experimental results in accordance with one or more embodiments.

FIG. 7A illustrates qualitative examples 706a-706f showing comparison with ablated/alternate versions and SDEdit on Stable Diffusion (SD). SD(s) refers to applying SDEdit on Stable Diffusion with strength s. As shown in FIG. 7A, the proposed PRedItOR performs the most plausible edits of an input image 704 (i.e., an image of a flower in a vase) relative based on an edit text 702 (i.e., "tomatoes").

Moreover, FIG. 7A illustrates that SDEdit's stochastic noise addition on Stable Diffusion, changes most of the background and structure. Moreover, without using the proposed conceptual edit step (ref. Prior (SDEdit) and Prior (rDDIM)), the edit text does not have information that the required embedding needs to be of a realistic photograph. However, when the conceptual edit is used (ref. Ours (SDEdit) and Ours (rDDIM)), the edited embedding obtained from the base image, captures the concept that the base image is realistic. As a result, without carefully designed edit prompt, the diffusion prior image editing system 102 provides the necessary edit while preserving structure and background information from the original image. This shows the importance of the conceptual edit step from the prior.

Figure 7B:
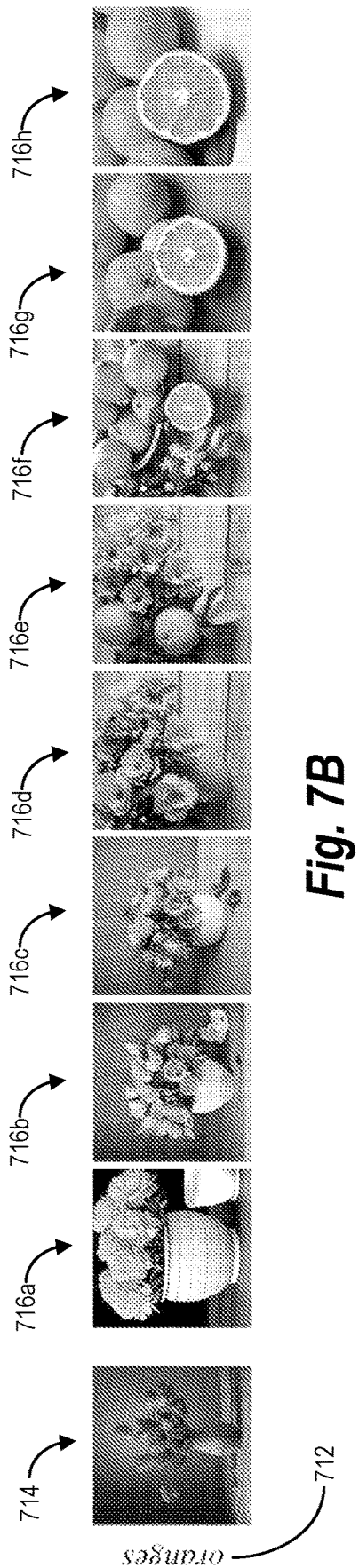

In one or more implementations, the diffusion prior image editing system 102 utilizes the conceptual edit step in the prior to accurately perform a text guided latent walk. In other words, as the conceptual strength parameter changes it will traverse the latent space to accurately reflect different combinations or trade-offs between the base digital image and the edit text. For example, FIG. 7B illustrates a base digital image 714 (i.e., a bowl with flowers) and an input text 712 (i.e., "oranges"). The example implementation of the diffusion prior image editing system 102 generates the modified digital images 716a-716h by iteratively increasing the conceptual strength parameter. As shown, the modified digital images 716a-716h progressively emphasize the input text 712 and de-emphasize the base digital image as the conceptual strength parameter increases. Indeed, the concept of 'oranges' is gradually encoded into the embedding as c increases.

Moreover, researchers compared example implementations of the diffusion prior image editing system 102 to the following existing text guided image editing baselines:

"P2P": Amir Hertz, Ron Mokady, Jay Tenenbaum, Kfir Aberman, Yael Pritch, and Daniel Cohen-Or. Prompt-to-prompt image editing with cross attention control. arXiv preprint arXiv:2208.01626, 2022.

"Imagic": Bahjat Kawar, Shiran Zada, Oran Lang, Omer Tov, Huiwen Chang, Tali Dekel, Inbar Mosseri, and Michal Irani. Imagic: Text-based real image editing with diffusion models, 2022.

"UniTune": Dani Valevski, Matan Kalman, Yossi Matias, and Yaniv Leviathan. Unitune: Text-driven image editing by fine tuning an image generation model on a single image, 2022.

"EDICT": Bram Wallace, Akash Gokul, and Nikhil Naik. Edict: Exact diffusion inversion via coupled transformations, 2022.

"P&P": Narek Tumanyan, Michal Geyer, Shai Bagon, and Tali Dekel. Plug-and-play diffusion features for text-driven image-to-image translation, 2022.

"SGD": Dong Huk Park, Grace Luo, Clayton Toste, Samaneh Azadi, Xihui Liu, Maka Karalashvili, Anna Rohrbach, and Trevor Darrell. Shape-guided diffusion with inside-outside attention, 2022.

"IP2P": Tim Brooks, Aleksander Holynski, and Alexei A. Efros. Instructpix2pix: Learning to follow image editing instructions, 2022.

As shown below in Table 1, researchers emphasized some of the characteristics that differentiate the proposed technique from the baselines in the last two columns. As mentioned previously, unlike the diffusion prior image editing system 102 almost all baselines either require a carefully designed base prompt, optimization of embedding, finetuning of existing model weights or training new models.

|  | Requires Base Prompt | Requires Optimization or Finetuning |
| --- | --- | --- |
| P2P | Yes | No |
| Imagic | Yes | Yes |
| UniTune | Yes | Yes |
| EDICT | Yes | Yes |
| SGD | Yes | No |
| IP2P | No | Yes |
| PRedItOR | No | No |

Figure 8:
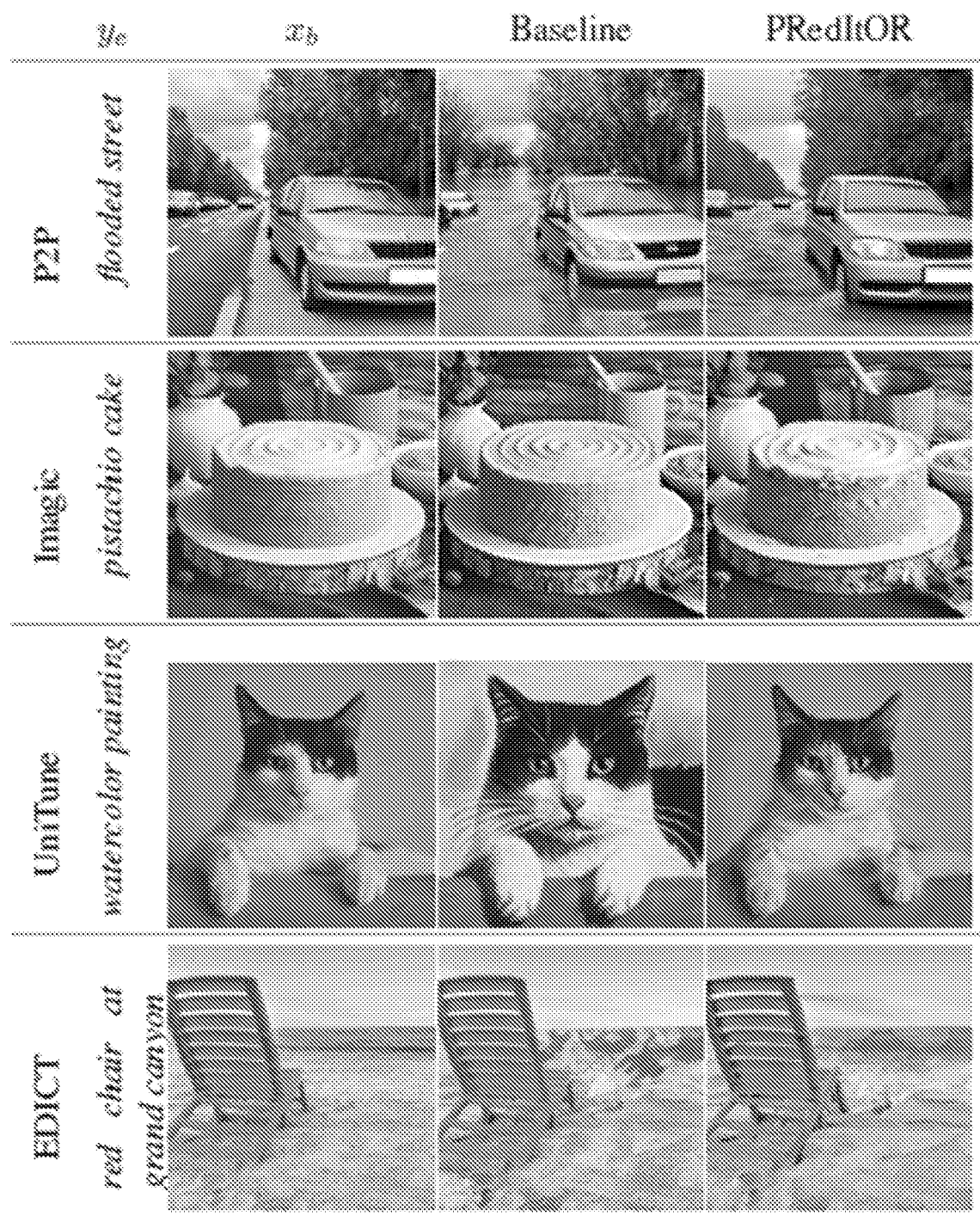
FIG. 8 illustrates experimental results in accordance with one or more embodiments.

In addition, researchers also performed qualitative comparisons of these baselines. In particular, FIG. 8 illustrates a plurality of digital images generated from different baseline digital images and edit text prompts utilizing baselines and PRedItOR. As shown in FIG. 8, the example implementation of the diffusion prior image editing system 102 performs as well as or better than baselines. The example implementation of the diffusion prior image editing system 102 benefits from the controllable conceptual edit setup using the diffusion prior and more accurate inversions in the structural edit setup as a result of the diffusion decoder being conditioned on CLIP image embedding.

In one or more embodiments, the diffusion prior image editing system 102 also utilizes a mask to further improve structure and background preservation. For example, the diffusion prior image editing system 102 can utilize a mask for editing of a localized region of a base image without modifying other regions in the image. To illustrate, the diffusion prior image editing system 102 can apply a mask during the structural edit step.

Figure 9:
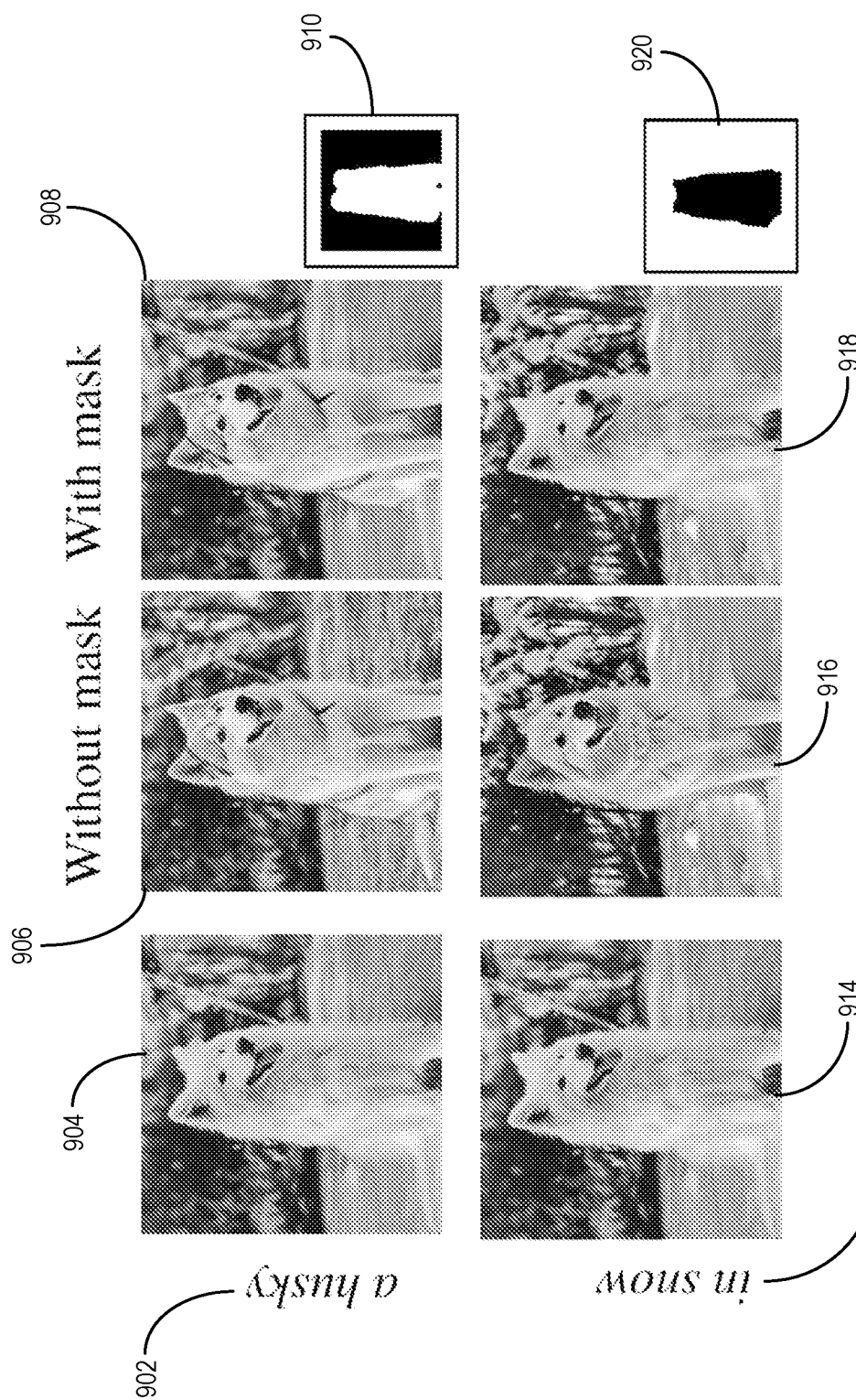
FIG. 9 illustrates experimental results in accordance with one or more embodiments.

FIG. 9 illustrates example results where adding an optional mask during structural edit step enhances the results by leaving the unmasked (black) regions untouched. In particular, the diffusion prior image editing system 102 analyzes base digital images 904, 914 utilizing edit text 902, 912 respectively. The diffusion prior image editing system 102 generates digital images 906, 916 by applying masks 910, 920 respectively. The diffusion prior image editing system 102 generates digital images 908, 918 without masks. In the illustrated "husky" example, changing the dog to a husky inadvertently adds snow to the background. Performing the structural edit only on the masked (white) region ensures that even the slightest changes to the unmasked regions in the base digital image 904 are avoided. Similarly, for the "in snow" example, performing the structural edit only on the masked (white) background preserves the shape of the dog portrayed in the digital image 914.

Figure 10:
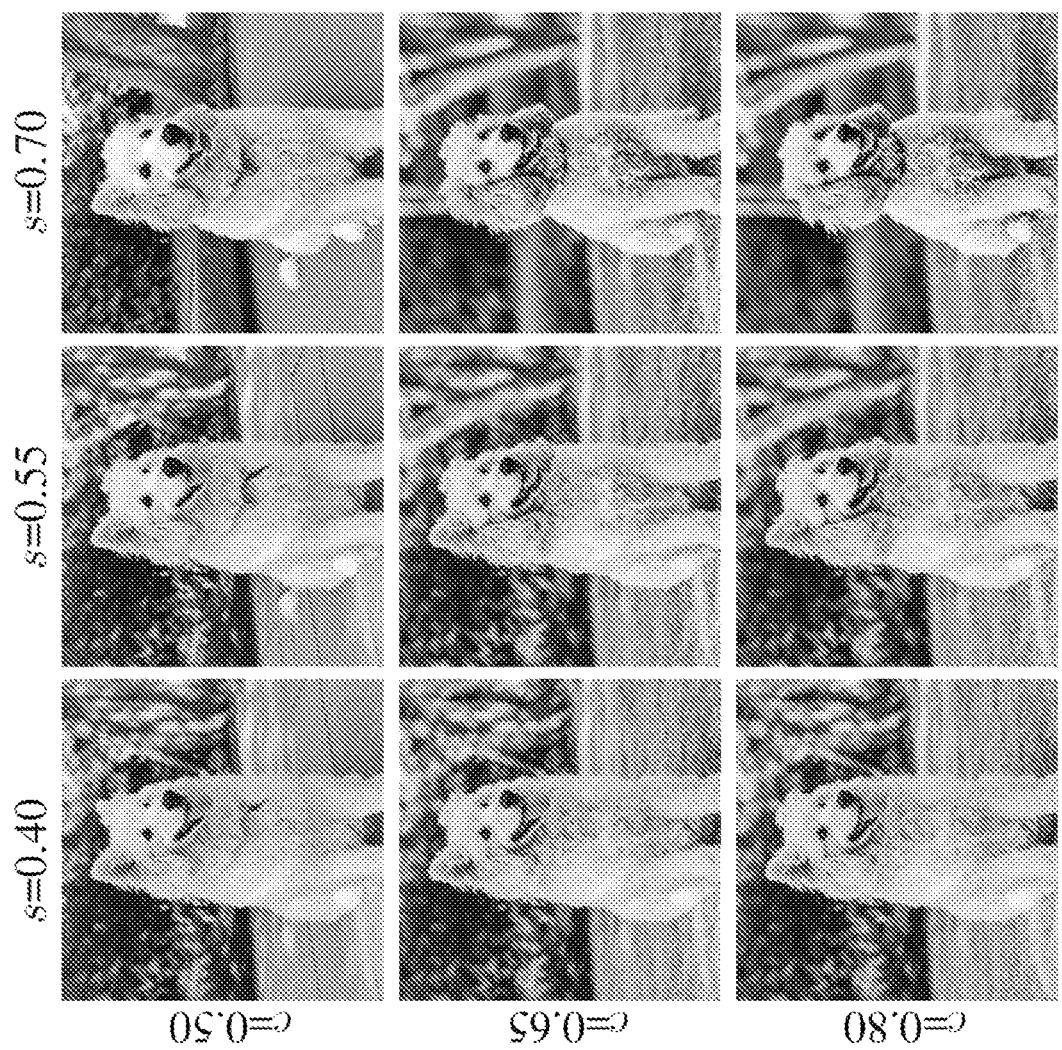
FIG. 10 illustrates experimental results in accordance with one or more embodiments.

In addition, FIG. 10 illustrates the effect of the conceptual edit strength c and the structural edit strength s on the final edits. Increasing c for the same s make the edits more pronounced while increasing s changes the overall structure of the base image. Indeed, as c increases, the modified digital images better reflect features of a "poodle" conceptually whereas as s increases, more of the image is modified including the pose of the dog and the background. The base image for this example is from FIG. 9. Moreover, the example implementation of the diffusion prior image editing system 102 utilized "poodle" as the edit text.

Additional research results demonstrating the efficacy example implementations of diffusion prior image editing system 102 are described by Hareesh Ravi, Sachin Kelkar, Midhun Harikumar, Ajinkya Kale in PRedItOR: Text Guided Image Editing with Diffusion Prior, arxiv.2302.07979, which is incorporated herein by reference herein in its entirety.

Figure 11:
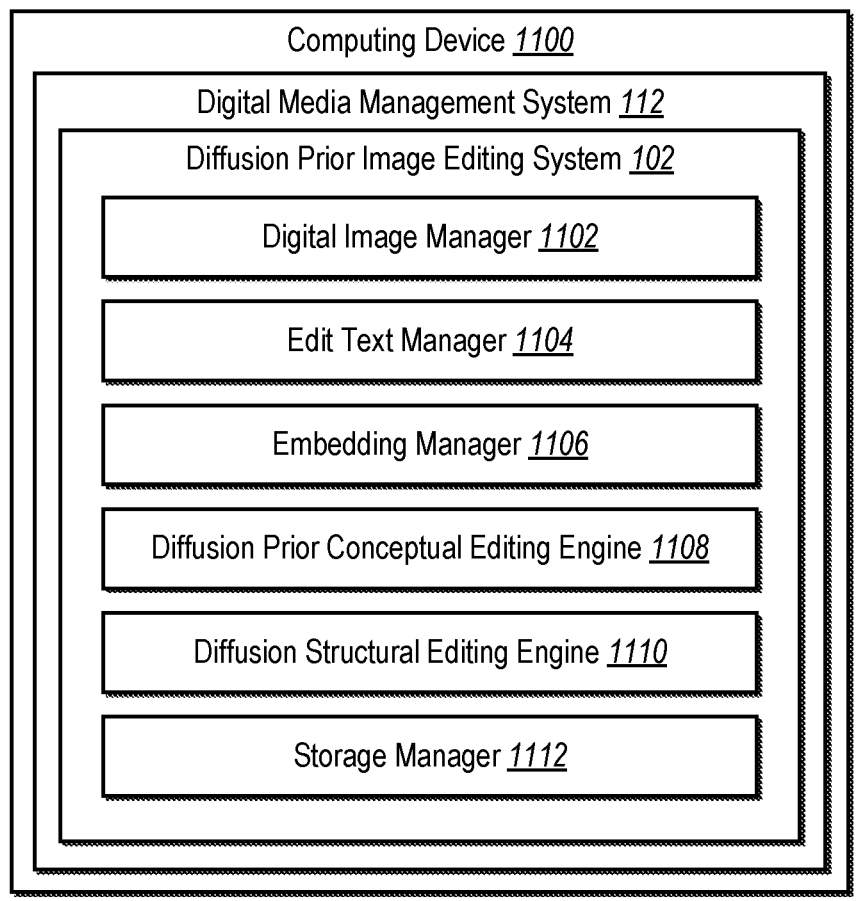
FIG. 11 illustrates an example schematic diagram of diffusion prior image editing system in accordance with one or more embodiments.

Looking now to FIG. 11, additional detail will be provided regarding components and capabilities of the diffusion prior image editing system 102. Specifically, FIG. 11 illustrates an example schematic diagram of the diffusion prior image editing system 102 on an example computing device 1100 (e.g., one or more of the client device 108 and/or the server(s) 104). In some embodiments, the computing device 1100 refers to a distributed computing system where different managers are located on different devices, as described above. As shown in FIG. 11, the diffusion prior image editing system 102 includes a digital image manager 1102, an edit text manager 1104, an embedding manager 1106, a diffusion prior conceptual editing engine 1108, a diffusion structural editing engine 1110, and a storage manager 1112.

As just mentioned, the diffusion prior image editing system 102 includes a digital image manager 1102. In particular, the digital image manager 1102 can capture, store, manage, maintain, and/or provide digital images (i.e., base digital images). For example, as described above, the digital image manager 1102 can capture a digital image utilizing a camera device or access a digital image from a camera roll of a client device.

Moreover, the diffusion prior image editing system 102 also includes an edit text manager 1104. In particular, the edit text manager 1104 can obtain, receive, generate, manage, and/or identify edit text corresponding to a base digital image (e.g., a text prompt to modify a digital image). For example, as described above, the edit text manager 1104 can capture edit text utilizing a text element or audio device of a client device.

As shown, the diffusion prior image editing system 102 also includes the embedding manager 1106. In particular, the embedding manager 1106 can generate, encode, and/or create embeddings from inputs. For example, as described above, the embedding manager 1106 can generate base image embeddings from base digital images. Similarly, the embedding manager 1106 can also generate edit text embeddings from edit text.

As further illustrated in FIG. 11, the diffusion prior image editing system 102 includes the diffusion prior conceptual editing engine 1108. In particular, the diffusion prior conceptual editing engine 1108 can perform conceptual editing processes utilizing a diffusion prior neural network (e.g., by creating, generating, or encoding a text-edited image embedding). For example, as described above, the diffusion prior conceptual editing engine 1108 can select a conceptual editing step for injecting a base image embedding and condition denoising steps of a diffusion prior neural network on edit text embeddings.

Additionally, the diffusion prior image editing system 102 includes the diffusion structural editing engine 1110. In particular, the diffusion structural editing engine 1110 can perform structural editing processes utilizing a diffusion neural network. For example, as described above, the diffusion structural editing engine 1110 can select a structural transition step and/or a structural number and utilize a diffusion noising model and/or diffusion neural network to generate a modified digital image. In one or more implementations, the diffusion structural editing engine 1110 utilizes a diffusion neural network to generate a latent representation that is then converted to the modified digital image (e.g., utilizing a neural network such as a variational auto encoder).

The diffusion prior image editing system 102 further includes a storage manager 1112. The storage manager 1112 operates in conjunction with, or includes, one or more memory devices such as a database that store various data such as base digital images, edit text, conceptual strength parameters, structural strength parameters, diffusion prior neural networks, diffusion noising models, diffusion neural networks, and/or modified digital images. For example, the memory device can include a base digital image, edit text for modifying the base digital image, a trained text-image encoder, a diffusion prior neural network, and a diffusion neural network.

In one or more embodiments, each of the components of the diffusion prior image editing system 102 are in communication with one another using any suitable communication technologies. Additionally, the components of the diffusion prior image editing system 102 is in communication with one or more other devices including one or more client devices described above. It will be recognized that although the components of the diffusion prior image editing system 102 are shown to be separate in FIG. 11, any of the subcomponents may be combined into fewer components, such as into a single component, or divided into more components as may serve a particular implementation. Furthermore, although the components of FIG. 11 are described in connection with the diffusion prior image editing system 102, at least some of the components for performing operations in conjunction with the diffusion prior image editing system 102 described herein may be implemented on other devices within the environment.

The components of the diffusion prior image editing system 102, in one or more implementations, includes software, hardware, or both. For example, the components of the diffusion prior image editing system 102 include one or more instructions stored on a computer-readable storage medium and executable by processors of one or more computing devices (e.g., the computing device 1100). When executed by the one or more processors, the computer-executable instructions of the diffusion prior image editing system 102 cause the computing device 1100 to perform the methods described herein. Alternatively, the components of the diffusion prior image editing system 102 comprises hardware, such as a special purpose processing device to perform a certain function or group of functions. Additionally, or alternatively, the components of the diffusion prior image editing system 102 includes a combination of computer-executable instructions and hardware.

Furthermore, the components of the diffusion prior image editing system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the diffusion prior image editing system 102 may be implemented as part of a stand-alone application on a personal computing device or a mobile device. Alternatively, or additionally, the components of the diffusion prior image editing system 102 may be implemented in any application that allows creation and delivery of marketing content to users, including, but not limited to, applications in ADOBE CREATIVE CLOUD, ADOBE PHOTOSHOP, ADOBE STOCK, and/or ADOBE ILLUSTRATOR. The foregoing are either registered trademarks or trademarks of Adobe Inc. in the United States and/or other countries.

FIGS. 1-11 and the corresponding text provide a number of different systems, methods, and non-transitory computer readable media for generating a modified digital image from a base digital image and edit text a diffusion prior. In addition to the foregoing, embodiments are describable in terms of flowcharts comprising acts for accomplishing a particular result. For example, FIG. 12 illustrates flowcharts of example sequences or series of acts in accordance with one or more embodiments.

Figure 12:
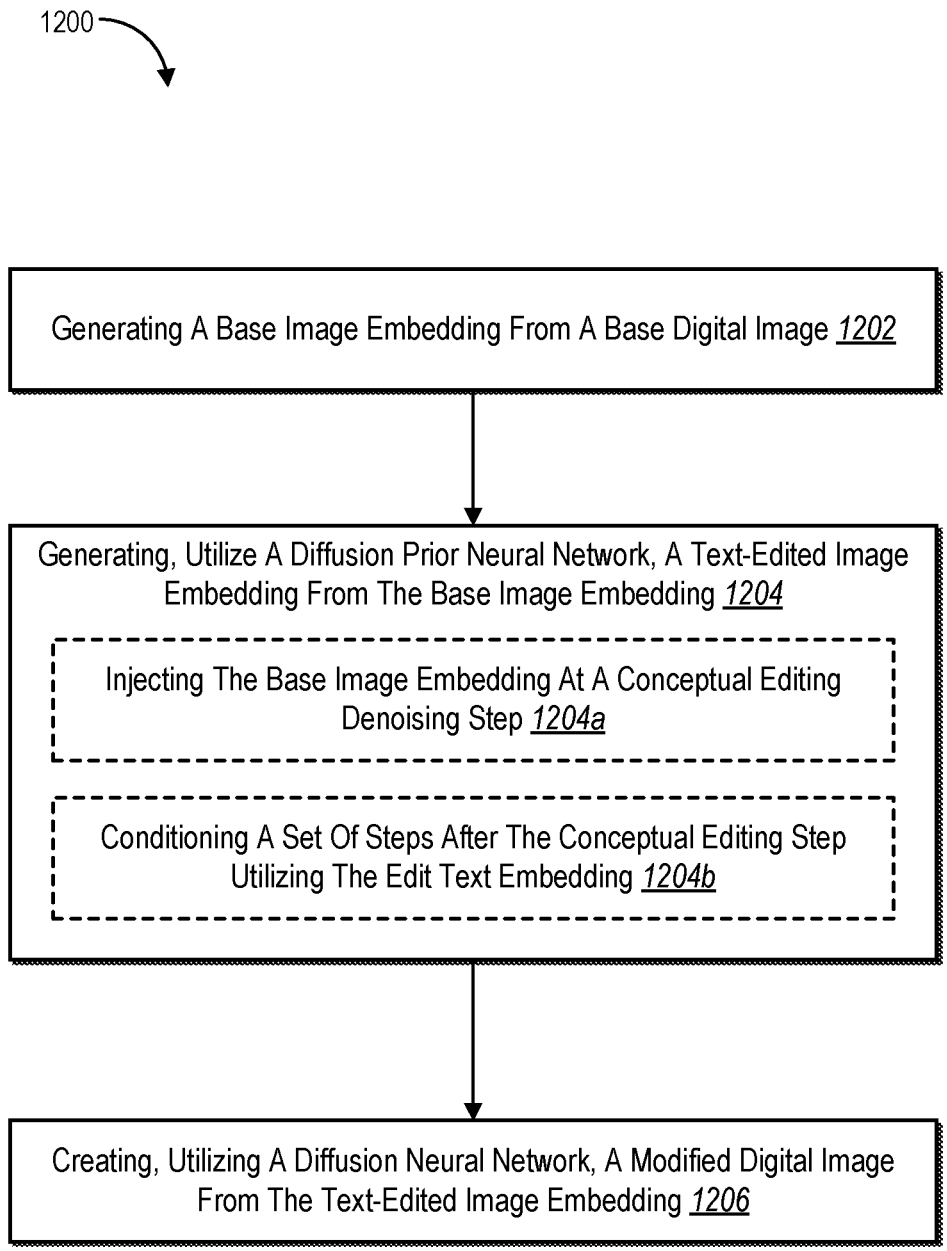
FIG. 12 illustrates a flowchart of a series of acts for generating a modified digital image utilizing text guided digital image editing via a diffusion prior neural network in accordance with one or more embodiments.

While FIG. 12 illustrates acts according to particular embodiments, alternative embodiments may omit, add to, reorder, and/or modify any of the acts shown in FIG. 12. The acts of FIG. 12 are be performed as part of a method (e.g., a computer-implemented method). Alternatively, a non-transitory computer readable medium comprises instructions, that when executed by one or more processors, cause a computing device to perform the acts of FIG. 12. In still further embodiments, a system performs the acts of FIG. 12. Additionally, the acts described herein may be repeated or performed in parallel with one another or in parallel with different instances of the same or other similar acts.

FIG. 12 illustrates an example series of acts 1200 for generating a modified digital image utilizing text guided digital image editing via a diffusion prior neural network in accordance with one or more embodiments. For example, the series of acts 1200 includes acts 1202-1206 of generating a base image embedding from a base digital image; generating, utilize a diffusion prior neural network, a text-edited image embedding from the base image embedding; and creating, utilizing a diffusion neural network, a modified digital image from the text-edited image embedding. As shown in FIG. 12, the series of acts 1200 can also include an act 1204a of injecting the base image embedding at a conceptual editing denoising step and an act 1204b of conditioning a set of steps after the conceptual editing step utilizing the edit text embedding.

To illustrate, in some implementations, the acts 1202-1206 include generating, utilizing a trained text-image encoder, a base image embedding from a base digital image; generating, utilize a diffusion prior neural network, a text-edited image embedding from the base image embedding and edit text; and creating, utilizing a diffusion neural network, a modified digital image from the text-edited image embedding and the base image embedding.

For example, in one or more embodiments, the series of acts 1200 includes generating, utilizing the trained text-image encoder, an edit text embedding form the edit text; and generating, utilizing the diffusion prior neural network, the text-edited image embedding from the base image embedding and the edit text embedding. Further, in some implementations, the series of acts 1200 includes generating, utilizing the diffusion prior neural network, the text-edited image embedding from the base image embedding and the edit text embedding comprises injecting the base image embedding at a conceptual editing step of the diffusion prior neural network.

Moreover, in one or more implementations, generating, utilizing the diffusion prior neural network, the text-edited image embedding from the base image embedding and the edit text embedding comprises conditioning a set of steps of the diffusion prior neural network after the conceptual editing step utilizing the edit text embedding. In addition, in one or more embodiments, the series of acts 1200 includes providing, for display via a user interface of a client device, a conceptual edit controller; and determining the conceptual editing step based on user interaction with the conceptual edit controller.

Further, in some implementations, creating, utilizing the diffusion neural network, the modified digital image from the text-edited image embedding and the base image embedding further comprises generating, utilizing a structural number of noising steps of a reverse diffusion neural network culminating at a structural noising transition step, a base image noise map from the base image embedding. Moreover, in one or more implementations, creating, utilizing the diffusion neural network, the modified digital image from the text-edited image embedding and the base image embedding further comprises, generating the modified digital image from the base image noise map by conditioning the structural number of denoising steps of the diffusion neural network on the text-edited image embedding. In some implementations, the series of acts 1200 includes providing, for display via a user interface of a client device, a structural edit controller; and determining the structural number based on user interaction with the structural edit controller.

To illustrate, in some implementations, the acts 1202-1206 include generating, utilizing the trained text-image encoder, a base image embedding from the base digital image and an edit text embedding from the edit text; generating, utilize the diffusion prior neural network, a text-edited image embedding by: injecting the base image embedding at a conceptual editing step of the diffusion prior neural network; and conditioning a set of steps of the diffusion prior neural network after the conceptual editing step utilizing the edit text embedding; and creating, utilizing a diffusion neural network, a modified digital image from the text-edited image embedding and the base image embedding.

For example, in one or more embodiments, the series of acts 1200 includes generating the text-edited image embedding by selecting the conceptual editing step from a plurality of steps of the diffusion prior neural network. Further, in some implementations, the series of acts 1200 includes selecting an alternative conceptual editing step from the plurality of steps; and generating an additional text-edited image embedding by injecting the base image embedding at the alternative conceptual editing step. In addition, in one or more embodiments, the series of acts 1200 includes generating an additional modified digital image from the additional text-edited image embedding.

In some implementations, the series of acts 1200 includes creating, utilizing the diffusion neural network, the modified digital image from the text-edited image embedding and the base image embedding by generating a base image noise map from the base image embedding through a structural number of diffusion steps culminating at a structural transition step. Moreover, in one or more embodiments, the series of acts 1200 includes creating, utilizing the diffusion neural network, the modified digital image from the text-edited image embedding and the base image embedding by denoising the base image noise map for the structural number of denoising steps of the diffusion neural network.

In addition, in one or more embodiments, the series of acts 1200 includes creating, utilizing the diffusion neural network, the modified digital image from the text-edited image embedding and the base image embedding by conditioning the denoising steps on the text-edited image embedding. In some implementations, the series of acts 1200 includes creating, utilizing the diffusion neural network, the modified digital image from the text-edited image embedding and the base image embedding by selecting the structural number based on user interaction via a user interface of a client device.

Further, in some implementations, the acts 1202-1206 include providing, for display via a user interface of a client device, a base digital image, edit text, and a conceptual edit controller; receiving a conceptual edit strength parameter based on user interaction with the conceptual edit controller; determining a conceptual editing step based on the conceptual edit strength parameter; generating, utilize a diffusion prior neural network, a text-edited image embedding by utilizing a base image embedding of the base digital image and an edit text embedding from the edit text according to the conceptual editing step; and generating a modified digital image from the text-edited image embedding.

In addition, in one or more embodiments, generating the modified digital image from the text-edited image embedding comprises generating, utilizing a diffusion neural network, the modified digital image from the text-edited image embedding and the base image embedding. Further, in one or more implementations, generating, utilize a diffusion prior neural network, the text-edited image embedding comprises injecting the base image embedding at the conceptual editing step of the diffusion prior neural network. Moreover, in some implementations, generating, utilize a diffusion prior neural network, the text-edited image embedding comprises conditioning a set of steps of the diffusion prior neural network after the conceptual editing step utilizing the edit text embedding.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
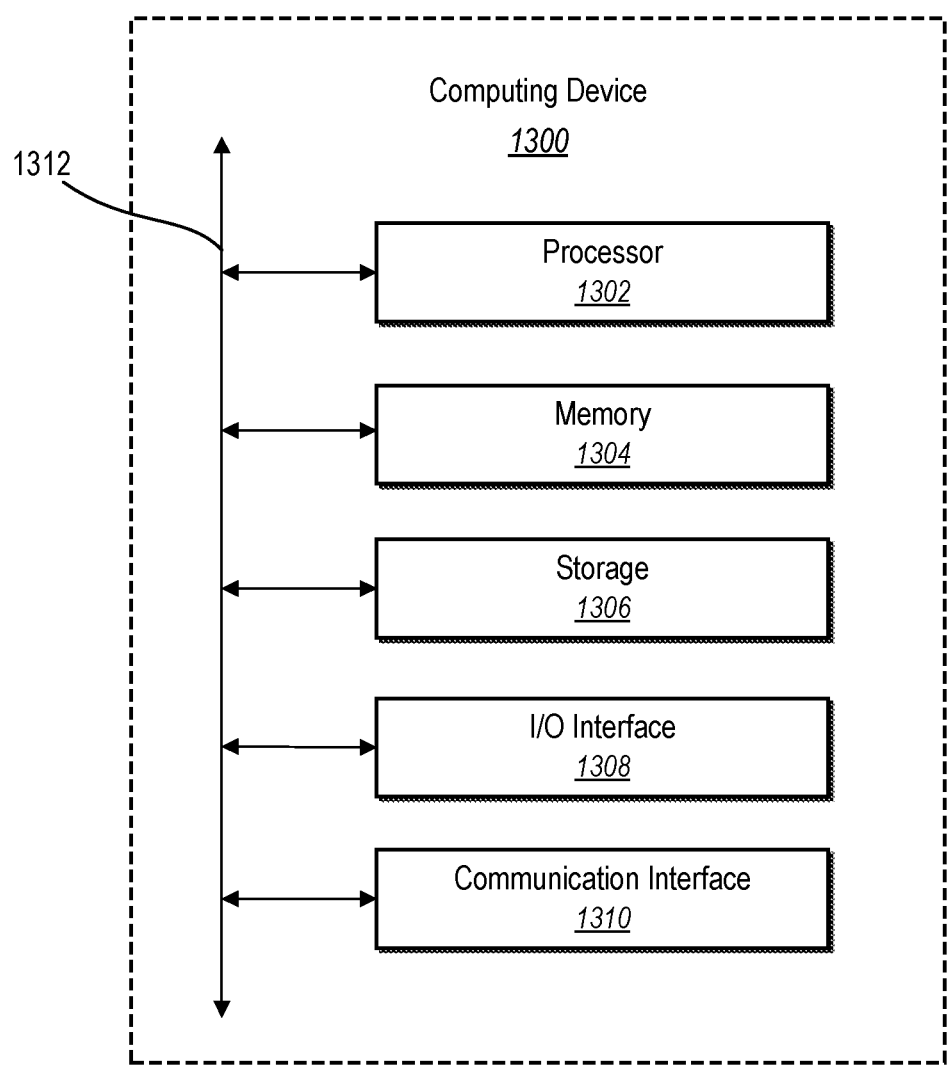
FIG. 13 illustrates a block diagram of an example computing device in accordance with one or more embodiments.

FIG. 13 illustrates, in block diagram form, an example computing device 1300 (e.g., the computing device 1100, the client device 108, and/or the server(s) 104) that may be configured to perform one or more of the processes described above. One will appreciate that the diffusion prior image editing system 102 can comprise implementations of the computing device 1300. As shown by FIG. 13, the computing device can comprise a processor 1302, memory 1304, a storage device 1306, an I/O interface 1308, and a communication interface 1310. Furthermore, the computing device 1300 can include an input device such as a touchscreen, mouse, keyboard, etc. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, storage device 1306 can comprise a non-transitory storage medium described above. The storage device 1306 may include a hard disk drive (HDD), flash memory, a Universal Serial Bus (USB) drive or a combination of these or other storage devices.

The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308. The touch screen may be activated with a writing device or a finger.

The I/O devices/interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1308 is configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating, utilizing a trained text-image encoder, a base image embedding from a base digital image;
   generating, utilizing the trained text-image encoder, an edit text embedding from edit text corresponding to the base digital image;
   generating, utilizing a diffusion prior neural network, a text-edited image embedding from the base image embedding and the edit text embedding; and
   creating, utilizing a diffusion neural network, a modified digital image from the text-edited image embedding and the base image embedding.

2. The computer-implemented method of claim 1, further comprising:
   generating, utilizing the trained text-image encoder, an edit text embedding from the edit text; and
   generating, utilizing the diffusion prior neural network, the text-edited image embedding from the base image embedding and the edit text embedding.

3. The computer-implemented method of claim 2, wherein generating, utilizing the diffusion prior neural network, the text-edited image embedding from the base image embedding and the edit text embedding comprises injecting the base image embedding at a conceptual editing step of the diffusion prior neural network.

4. The computer-implemented method of claim 3, wherein generating, utilizing the diffusion prior neural network, the text-edited image embedding from the base image embedding and the edit text embedding comprises conditioning a set of steps of the diffusion prior neural network after the conceptual editing step utilizing the edit text embedding.

5. The computer-implemented method of claim 3, further comprising:
   providing, for display via a user interface of a client device, a conceptual edit controller; and
   determining the conceptual editing step based on user interaction with the conceptual edit controller.

6. The computer-implemented method of claim 1, wherein creating, utilizing the diffusion neural network, the modified digital image from the text-edited image embedding and the base image embedding further comprises generating, utilizing a structural number of noising steps of a reverse diffusion neural network culminating at a structural noising transition step, a base image noise map from the base image embedding.

7. The computer-implemented method of claim 6, wherein creating, utilizing the diffusion neural network, the modified digital image from the text-edited image embedding and the base image embedding further comprises, generating the modified digital image from the base image noise map by conditioning a structural number of denoising steps of the diffusion neural network on the text-edited image embedding.

8. The computer-implemented method of claim 7, further comprising:
   providing, for display via a user interface of a client device, a structural edit controller; and
   determining the structural number of noising steps and the structural number of denoising steps based on user interaction with the structural edit controller.

9. A system comprising:
   one or more memory devices comprising a base digital image, edit text for modifying the base digital image, a trained text-image encoder, a diffusion prior neural network, and a diffusion neural network; and
   one or more processors configured to cause the system to:
   generate, utilizing the trained text-image encoder, a base image embedding from the base digital image and an edit text embedding from the edit text;
   generate, utilizing the diffusion prior neural network, a text-edited image embedding by:
      injecting the base image embedding at a conceptual editing step of the diffusion prior neural network; and
      conditioning a set of steps of the diffusion prior neural network after the conceptual editing step utilizing the edit text embedding; and
   create, utilizing a diffusion neural network, a modified digital image from the text-edited image embedding and the base image embedding.

10. The system of claim 9, wherein the one or more processors are further configured to cause the system to generate the text-edited image embedding by selecting the conceptual editing step from a plurality of steps of the diffusion prior neural network.

11. The system of claim 10, wherein the one or more processors are further configured to cause the system to:
   select an alternative conceptual editing step from the plurality of steps; and
   generate an additional text-edited image embedding by injecting the base image embedding at the alternative conceptual editing step.

12. The system of claim 11, wherein the one or more processors are further configured to cause the system to generate an additional modified digital image from the additional text-edited image embedding.

13. The system of claim 9, wherein the one or more processors are further configured to cause the system to create, utilizing the diffusion neural network, the modified digital image from the text-edited image embedding and the base image embedding by generating a base image noise map from the base image embedding through a structural number of diffusion steps culminating at a structural transition step.

14. The system of claim 13, wherein the one or more processors are further configured to cause the system to create, utilizing the diffusion neural network, the modified digital image from the text-edited image embedding and the base image embedding by denoising the base image noise map for a structural number of denoising steps of the diffusion neural network.

15. The system of claim 14, wherein the one or more processors are further configured to cause the system to create, utilizing the diffusion neural network, the modified digital image from the text-edited image embedding and the base image embedding by conditioning the denoising steps on the text-edited image embedding.

16. The system of claim 13, wherein the one or more processors are further configured to cause the system to create, utilizing the diffusion neural network, the modified digital image from the text-edited image embedding and the base image embedding by selecting the structural number of diffusion steps based on user interaction via a user interface of a client device.

17. A non-transitory computer readable medium storing executable instructions which, when executed by a processing device, cause the processing device to perform operations comprising:
  providing, for display via a user interface of a client device, a base digital image, edit text, and a conceptual edit controller;
  receiving a conceptual edit strength parameter based on user interaction with the conceptual edit controller;
  determining a conceptual editing step based on the conceptual edit strength parameter;
  generating, utilizing a diffusion prior neural network, a text-edited image embedding by utilizing a base image embedding of the base digital image and an edit text embedding from the edit text according to the conceptual editing step; and
  generating, utilizing a diffusion neural network, a modified digital image from the text-edited image embedding and the base image embedding.

18. The non-transitory computer readable medium of claim 17, wherein generating the modified digital image from the text-edited image embedding comprises generating, utilizing a diffusion neural network, the modified digital image from the text-edited image embedding and the base image embedding.

19. The non-transitory computer readable medium of claim 17, wherein generating, utilize a diffusion prior neural network, the text-edited image embedding comprises injecting the base image embedding at the conceptual editing step of the diffusion prior neural network.

20. The non-transitory computer readable medium of claim 17, wherein generating, utilize a diffusion prior neural network, the text-edited image embedding comprises conditioning a set of steps of the diffusion prior neural network after the conceptual editing step utilizing the edit text embedding.

* * * * *